US012595382B2

(12) United States Patent
Suzuki et al.

(10) Patent No.: US 12,595,382 B2
(45) Date of Patent: Apr. 7, 2026

(54) WATER-BORNE COATING COMPOSITION SET AND MULTILAYER-COATING-FILM FORMING METHOD USING SAME

(71) Applicant: NIPPON PAINT AUTOMOTIVE COATINGS CO., LTD., Osaka (JP)

(72) Inventors: Satoshi Suzuki, Hirakata (JP); Kazuaki Sakoyama, Hirakata (JP); Hirotaka Nagata, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 907 days.

(21) Appl. No.: 17/788,216

(22) PCT Filed: Dec. 22, 2020

(86) PCT No.: PCT/JP2020/047997
§ 371 (c)(1),
(2) Date: Jun. 22, 2022

(87) PCT Pub. No.: WO2021/132258
PCT Pub. Date: Jul. 1, 2021

(65) Prior Publication Data
US 2023/0040282 A1 Feb. 9, 2023

(30) Foreign Application Priority Data

Dec. 24, 2019 (JP) ................................. 2019-232918

(51) Int. Cl.
| | |
|---|---|
| *C09D 5/36* | (2006.01) |
| *B05D 1/36* | (2006.01) |
| *B05D 3/02* | (2006.01) |
| *B05D 7/24* | (2006.01) |
| *C09D 7/62* | (2018.01) |
| *C09D 201/00* | (2006.01) |

(52) U.S. Cl.
CPC ................. *C09D 5/36* (2013.01); *B05D 1/36* (2013.01); *B05D 3/02* (2013.01); *B05D 7/24* (2013.01); *C09D 7/62* (2018.01); *C09D 201/00* (2013.01)

(58) Field of Classification Search
None
See application file for complete search history.

(56) References Cited

U.S. PATENT DOCUMENTS

| | | | |
|---|---|---|---|
| 5,079,030 A | 1/1992 | Tomioka et al. | |
| 2006/0057363 A1 | 3/2006 | Takahashi et al. | |

| | | | | |
|---|---|---|---|---|
| 2013/0089731 A1* | 4/2013 | Imanaka | ............ | C08G 18/6254 |
| | | | | 427/372.2 |
| 2018/0214912 A1 | 8/2018 | Itoh et al. | | |
| 2019/0329291 A1 | 10/2019 | Tsubone et al. | | |

FOREIGN PATENT DOCUMENTS

| | | | | |
|---|---|---|---|---|
| CN | 109415593 | 3/2019 | | |
| JP | 2-261570 | 10/1990 | | |
| JP | 2002-273333 | 9/2002 | | |
| JP | 2004-358329 | 12/2004 | | |
| JP | 2006-95522 | 4/2006 | | |
| JP | 2009-241067 | 10/2009 | | |
| JP | 2016-185527 | 10/2016 | | |
| WO | WO-2017217471 A1 * | 12/2017 | ............... | B05D 5/06 |

OTHER PUBLICATIONS

International Preliminary Report on Patentability and Written Opinion of the International Searching Authority issued Jun. 28, 2022 in International (PCT) Application No. PCT/JP2020/047997.
Office Action issued Mar. 19, 2025 in corresponding Canadian Application No. 3,162,837.
International Search Report (ISR) issued Mar. 16, 2021 in International (PCT) Application No. PCT/JP2020/047997.

* cited by examiner

*Primary Examiner* — Michael Forrest
(74) *Attorney, Agent, or Firm* — Wenderoth, Lind & Ponack, L.L.P.

(57) ABSTRACT

Provided is a water-borne coating composition capable of forming a metallic coating film having high-design, and further capable of forming a coating film that exhibits good coating film properties. A water-borne coating composition set for forming a multilayer coating film, containing a first base coating composition that forms a first base coating film and a second base coating composition that forms a second base coating film, wherein the first base coating composition contains a first coating film-forming resin, a first curing agent, a first inorganic brightener, and a first hydrophobic association rheology control agent, the first inorganic brightener contains one or more species selected from the group consisting of silica, talc, calcium carbonate, kaolin, barium sulfate, and diatomaceous earth, the second base coating composition contains a second coating film-forming resin, a second curing agent, a second luster material, a second inorganic rheology control agent, a second hydrophobic association rheology control agent, and a second dispersant, and the second inorganic rheology control agent contains a layered material having a stacked structure of a large number of inorganic crystal layers stacked.

16 Claims, No Drawings

WATER-BORNE COATING COMPOSITION SET AND MULTILAYER-COATING-FILM FORMING METHOD USING SAME

TECHNICAL FIELD

The present disclosure relates to a water-borne coating composition set and a method for forming a multilayer coating film using the same.

BACKGROUND

For example, coating having metallic feeling have attracted attention in automobile appearance. Such coating films are required to have a high flip-flop property (so-called FF property). In order to improve the flip-flop property, it is necessary for pigment to exist with a certain orientation in a coating material. In addition, it is preferable that a coating film having metallic feeling satisfies a dense feeling without exhibiting a grain feeling (glare).

JP-A-2006-95522 (Patent Literature 1) discloses a method which purposes to form a coating film with a metallic tone and high-design and in which a water-borne base coat material (A1) with the solid content in the coating material adjusted at 20 to 40% by weight is applied to an article to be coated to achieve a dry film thickness of 1 to 15 μm, then a water-borne base coat material (A2) with the solid content in the coating material adjusted at 2 to 15% by weight is applied to the uncured coating film to achieve a dry film thickness of 0.1 to 5 μm.

CITATIONS LIST

Patent Literature

Patent Literature 1: JP-A-2006-95522

SUMMARY OF INVENTION

Technical Problems

However, when the water-borne base coat material (A1) and the water-borne base coat material (A2) disclosed in Patent Literature 1 are used, the orientation of the luster pigment tends to be insufficient, and unevenness may occur in a coating film appearance. Furthermore, when the orientation of the luster pigment is insufficient, diffuse reflection of light is likely to occur, and thus, high-design may deteriorate.

Recently, industrial products such as automobiles adopt designs incorporating many curved surfaces. Therefore, there is a need for a coating film that can be easily applied even to an article to be coated having a complicated shape and has beautiful metallic feeling.

In addition, it is required for coating compositions for automobiles that physical properties such as chipping resistance and water resistance of coating films can be secured.

In a coating line of an automobile external board, when a bake-cured base coating film has a defect such as bits or a coating film defect, a step of applying a top coating material (base coating material and clear coating material) may be performed after the defective portion is sanded and corrected. At that time, a phenomenon in which the sanding mark formed by the sanding (streaks formed at the portion sanded with sandpaper or the like) appears into the coating film after the top coating (this phenomenon is called sanding-mark appearing) may occur. This sanding-mark appearing is likely to occur particularly when a luster material is contained in the topcoat material. Therefore, in particular, in metallic or mica coating colors, as a challenge regarding coating workability, a coating film in which the sanding-mark appearing hardly occurs (sanding-mark hiding property) is required.

However, in the coating composition for forming a metallic coating film disclosed in Patent Literature 1, only improvement in design is focused, and guarantee of the above-described coating film properties is left to another coating film. Therefore, for example, it is necessary to prepare a coating composition in consideration of the relationship between a coating film that ensures the physical properties of the coating film and a coating film that exhibits metallic feeling design. As a result, a superior metallic coating film may not be obtained. In addition, the step of forming a multilayer coating film also becomes complicated.

In order to solve such problems, there is a need for a coating composition capable of forming a metallic coating film having high-design, and further capable of forming a coating film exhibiting good coating film properties.

In view of the above current state of the art, the present disclosure provides a water-borne coating composition set for forming a multilayer coating film, which can form a coating film having superior design and metallic feeling, and further has coating film properties and sanding-mark hiding property with improved chipping resistance and the like. The water-borne coating composition set for forming a multilayer coating film of the present disclosure can form a multilayer coating film having superior water resistance.

Further, an object of the present disclosure is to provide a method for forming a multilayer coating film using a water-borne coating composition set.

Solution to Problems

The present disclosure provides the following embodiments to solve the aforementioned problems.

[1] The present disclosure is directed to:

a water-borne coating composition set for forming a multilayer coating film having a first base coating film and a second base coating film, the water-borne coating composition set including a first base coating composition that forms the first base coating film and a second base coating composition that forms the second base coating film, in which the first base coating composition includes a first coating film-forming resin, a first curing agent, a first inorganic brightener, and a first hydrophobic association rheology control agent, the first inorganic brightener includes one or more species selected from the group consisting of silica, talc, calcium carbonate, kaolin, barium sulfate, and diatomaceous earth, the second base coating composition includes a second coating film-forming resin, a second curing agent, a second luster material, a second inorganic rheology control agent, a second hydrophobic association rheology control agent, and a second dispersant, and the second inorganic rheology control agent includes a layered material having a stacked structure of inorganic crystal layers.

[2] In one embodiment, the second luster material includes a surface-treated luster material.

[3] In one embodiment, the second luster material includes a luster material having a scaly shape and having an aspect ratio of 5 to 2000.

[4] In one embodiment, the second base coating composition contains the second inorganic rheology control agent in an amount of 1 part by mass or more and 7 parts by mass or less based on 100 parts by mass of a total resin solid content of the second coating film-forming resin and the second curing agent, and the second base coating composition contains the second hydrophobic association rheology control agent in an amount of 1 part by mass or more and 15 parts by mass or less based on 100 parts by mass of a total resin solid content of the second coating film-forming resin and the second curing agent.

[5] In one embodiment, the second base coating composition further includes a second inorganic brightener, and where an amount of the first inorganic brightener contained in the first base coating composition based on 100 parts by mass of a total resin solid content of the first coating film-forming resin and the first curing agent is represented by (Am1), and an amount of the second inorganic brightener contained in the second base coating composition based on 100 parts by mass of a total resin solid content of the second coating film-forming resin and the second curing agent is represented by (Am2), a ratio (Am1)/(Am2) of Am1 to Am2 is 2.0 or more.

[6] In one embodiment, a nonvolatile content (NV1) in the first base coating composition is 10% or more and 45% or less.

[7] In one embodiment, a nonvolatile content (NV2) in the second base coating composition is 3% or more and 18% or less.

[8] In one embodiment, the first base coating composition further includes at least one of a first luster material and a first inorganic rheology control agent.

[9] In one embodiment, the second coating film-forming resin includes at least one resin selected from among an acrylic resin, a urethane-based resin, and a polyester resin.

[10] In one embodiment, the second inorganic rheology control agent is a silicate layered compound.

[11] In one embodiment, at least one of the first hydrophobic association rheology control agent and the second hydrophobic association rheology control agent includes a urethane-based hydrophobic association rheology control agent.

[12] In one embodiment, the first base coating composition further includes a first dispersant, and at least one of the first dispersant and the second dispersant includes a polymer-type dispersant having at least one type of group selected from anionic groups, cationic groups, and nonionic groups.

[13] In one embodiment, the first inorganic brightener includes an inorganic brightener having a positively charged surface.

[14] In one embodiment, the second inorganic brightener includes an inorganic brightener having a positively charged surface.

[15] In one embodiment, the first inorganic rheology control agent has a thickness of 100 nm or less.

[16] In one embodiment, the second inorganic rheology control agent has a thickness of 100 nm or less.

[17] In another embodiment, the present disclosure is directed to a method for forming a multilayer coating film using the water-borne coating composition set for forming a multilayer coating film, the method for forming a multilayer coating film including:

a step of applying the first base coating composition to an article to be coated to form an uncured first base coating film;

a step of applying the second base coating composition to the uncured first base coating film to form an uncured second base coating film;

a step of applying a clear coating composition for forming a clear coating film to the uncured second base coating film to form an uncured clear coating film; and a step of simultaneously baking and curing the uncured first base coating film, the uncured second base coating film, and the uncured clear coating film to form a multilayer coating film, in which a heat-cured first base coating film formed from the first base coating composition has a film thickness (t1) of 1 μm or more and 35 μm or less, and a heat-cured second base coating film formed from the second base coating composition has a film thickness (t2) of 1 μm or more and 20 μm or less.

[18] In one embodiment, the film thickness (II) of the heat-cured first base coating film and the film thickness (t2) of the heat-cured second base coating film have a relationship of (t1)≥(t2).

Advantageous Effects of Invention

The water-borne coating composition set for forming a multilayer coating film of the present disclosure can form a coating film superior in metallic feeling design, and can form a coating film having good coating film properties such as chipping resistance and water resistance.

DESCRIPTION OF EMBODIMENTS

First, the process leading to the present disclosure is described. Commonly, in a water-borne coating composition for forming a single layer coating film with metallic feeling, the solid content (also referred to as nonvolatile (NV) content) of the coating composition is set high (for example, NV content=25%). If the NV content is increased, the viscosity of the coating material can be made higher and it is possible to prevent the coating composition from flowing, and it is also possible to prevent a luster material from settling.

However, since a water-borne coating composition having a high NV content has a high viscosity as well, there has arisen a problem that a luster material is difficult to align uniformly. For example, when a coating film is formed using a water-borne coating composition having a NV content of about 25%, the orientation of a luster material is not uniform, so that a grain feeling (glare) occurs in the coating film and the power to hide a base may decrease.

In order to solve such problems, it has been proposed to stack a plurality of thin films formed from a water-borne coating composition having a high NV content. This is expected to improve the orientation of the luster material. However, the orientation of a luster material has not been improved yet, and no satisfactory metallic coating films have been obtained.

In addition, when a multilayer coating film is formed by, for example, wet-on-wet application using a water-borne coating composition, phase mixture may occur in the vicinity of an interface of layers. However, when attempts are made to suppress the phase mixture, reduction in design and reduction in coating film physical properties may occur. In view of such situations, the present disclosers have intensively studied a coating composition capable of forming a coating film having high design and coating film physical properties in a well-balanced manner, and have accomplished the present disclosure.

The water-borne coating composition set of the present disclosure that solves all such problems is a water-borne coating composition set for forming a multilayer coating film having a first base coating film and a second base coating film, the water-borne coating composition set including a first base coating composition that forms the first base coating film and a second base coating composition that forms the second base coating film, in which the first base coating composition includes a first coating film-forming resin, a first curing agent, a first inorganic brightener, and a first hydrophobic association rheology control agent, the first inorganic brightener includes one or more species selected from the group consisting of silica, talc, calcium carbonate, kaolin, barium sulfate, and diatomaceous earth, the second base coating composition includes a second coating film-forming resin, a second curing agent, a second luster material, a second inorganic rheology control agent, a second hydrophobic association rheology control agent, and a second dispersant, and the second inorganic rheology control agent includes a layered material having a stacked structure in which a large number of inorganic crystal layers are stacked.

With any water-borne coating composition set for forming a multilayer coating film according to the present disclosure, the orientation of a luster material (luster pigment) is improved. Therefore, it is possible to form a superior metallic coating film that can suppress diffuse reflection of light and has sufficient highlight brightness. Furthermore, using the water-borne coating composition set for forming a multilayer coating film according to the present disclosure, even an article to be coated having a complicated shape can be easily coated, and a coating film having beautiful metallic feeling can be formed.

In addition, any water-borne coating composition set for forming a multilayer coating film according to the present disclosure forms a coating film having superior coating film properties such as good chipping resistance, weather resistance, water resistance, and high-temperature water resistance. Furthermore, the coating film has superior sanding-mark hiding property and also is superior in base hiding property.

Although it should not be construed as being limited to a particular theory, in the present disclosure, the combination of a particular first base coating composition and a particular second base coating composition controls light transmission. This is presumed to contribute to the superior weather resistance of the multilayer coating film.

Furthermore, although it should not be construed as being limited to a particular theory, in the water-borne coating composition set for forming a multilayer coating film according to the present disclosure, each coating composition has a prescribed configuration, so that phase mixture that can occur between layers of a prescribed first base coating composition and a prescribed second base coating composition according to the present disclosure can be greatly suppressed. Therefore, for example, a multilayer coating film can be formed using wet-on-wet application. Thus, since the number of steps for forming a coating film can be reduced, the environmental load is reduced.

In addition, since the second inorganic rheology control agent contains a layered material having a stacked structure of inorganic crystal layers, although it should not be construed as being limited to a particular theory, structuralization (cohesive force) occurs due to interaction between the second luster material and the second inorganic rheology control agent, so that orientation disorder of the second luster material in the second base coating film is prevented and a superior metallic coating film is formed. Furthermore, the resulting coating film is superior in water resistance.

In one embodiment, even when the concentration (pigment weight concentration (PWC)) of the second luster material contained in the second base coating composition is high, the stability of the second base coating composition can be easily maintained because the second inorganic rheology control agent according to the present disclosure is contained within the range described in the present description. Furthermore, the cohesive force of the second base coating film is further improved, and a coating film superior in design, coating film physical properties, and water resistance can be easily formed.

In the following, a water-borne coating composition set according to the present disclosure and a method for forming a multilayer coating film using the same will be described in detail.

<First Base Coating Composition>

The first base coating composition in the present disclosure includes a first coating film-forming resin, a first curing agent, a first inorganic brightener, and a first hydrophobic association rheology control agent. Any water-borne coating composition set according to the present disclosure in which the first base coating composition has such a composition and which further contains a prescribed second base coating composition to be described later can form a multilayer coating film (bright multilayer coating film) having a beautiful metallic feeling in addition to superior base hiding property and chipping resistance.

In one embodiment, the first base coating composition further includes at least one of a first luster material and a first inorganic rheology control agent. For example, when containing the first luster material, the first base coating composition can further improve the base hiding property. In addition, a multilayer coating film that exhibits a deeper metallic feeling can be formed together with the second base coating film.

In an embodiment including the first luster material, the first base coating composition may include a first inorganic rheology control agent. By virtue of using the first luster material and the first inorganic rheology control agent in combination in the first base coating composition, it is possible to avoid the settling of the first luster material during the formation of a coating film and avoid the occurrence of clouding in the coating film. In addition, since the first luster material is more uniformly oriented, a first base coating film having more improved design and a multilayer coating film having the first base coating film are obtained.

In one embodiment, the nonvolatile content (NV1) in the first base coating composition is 10% or more and 45% or less, and for example, (NV1) is 10% or more and 35% or less. In one embodiment, (NV1) is 10% or more and 30% or less, and for example, is 15% or more and 25% or less.

The nonvolatile content (NV1) is a value calculated from [(the mass of the first base coating composition after drying)/(the mass of the first base coating composition before drying)]×100(%). The nonvolatile content can be controlled by adjusting the amount of a solvent in the coating composition.

Thanks to the condition that the nonvolatile content (NV1) is within the above range, the volume shrinkage ratios of the first base coating film and the second base coating film according to the present disclosure can be maintained within a sufficient range and a multilayer coating film having good metallic feeling can be formed.

In addition, good coating film properties can be obtained, for example, the sagging property of the first base coating composition can be improved, and coating workability can be improved.

The nonvolatile content can be measured by the method of JIS K5601-1-2 (heating residue).

The dry film thickness (t1) of the first base coating film to be formed is 1 μm or more and 35 μm or less, and for example, is 1 μm or more and 30 μm or less. In another embodiment, the film thickness of the first base coating film is 1 μm or more and 16 μm or less. In addition, the first base coating composition according to the present disclosure can prevent a phenomenon in which the coating composition drips and settling of the first luster material added as necessary. Furthermore, a coating film with uniform beautiful metallic feeling can be formed even on an article to be coated with a complicated shape having many curved surfaces.

(First Coating Film-Forming Resin)

In one embodiment, the first coating film-forming resin in the present disclosure is a resin having a number average molecular weight of 5,000 or more and 30,000 or less, for example, 7,000 or more and 25,000 or less. Thanks to the condition that the number average molecular weight is within such a range, good workability can be achieved, and curability suitable for the multilayer coating film according to the present disclosure can be achieved.

In the present description, a molecular weight is determined by GPC using styrene polymers as standards.

In one embodiment, the first coating film-forming resin has a hydroxyl value of 20 or more and 180 or less, and for example, has a hydroxyl value of 30 or more and 160 or less. Thanks to the condition that the hydroxyl value of the first coating film-forming resin is within such a range, the first base coating film can have sufficient water resistance, for example, superior high-temperature water resistance (80° C.). It also has good coating film curability.

In one embodiment, the first coating film-forming resin has an acid value of 10 mg KOH/g or more and 80 mg KOH/g or less, and for example, has an acid value of 15 mg KOH/g or more and 70 mg KOH/g or less. Thanks to the condition that the acid value of the first coating film-forming resin is within such a range, the first base coating film can have sufficient water resistance, for example, superior high-temperature water resistance (80° C.). It also has good coating film curability.

Examples of the first coating film-forming resin include coating film-forming resins such as acrylic resins, polyester resins, alkyd resins, polyether resins, polyolefin resin, urethane-based resins, and melamine-based resins. These resins may be contained singly or in combination of two or more of them.

For example, it is preferable to use a first coating film-forming resin selected from among acrylic resin, polyester resin, melamine-based resin, urethane-based resin, and mixtures thereof from the viewpoints of coating film strength, weather resistance, and water resistance. For example, the first coating film-forming resin includes at least one species selected from among acrylic resins, urethane-based resins, and polyester resins.

In one embodiment, an acrylic resin and a urethane-based resin may be used in combination. In this case, an acrylic resin can be contained in an amount of 40 parts by mass or more and 60 parts by mass or less in solid content amount, and urethane-based resin can be contained in an amount of 1 part by mass or more and 20 parts by mass or less in solid content amount, based on 100 parts by mass of the total resin solid content of the first coating film-forming resin and the first curing agent.

When a plurality of species of acrylic resin are used, the sum total of the parts by mass of the respective species of acrylic resin can be appropriately adjusted to fall within the above range and when a plurality of species of urethane-based resin are used, the sum total of the parts by mass of the respective species of urethane-based resin can be appropriately adjusted to fall within the above range.

In the present disclosure, the first coating film-forming resin and the first curing agent are collectively referred to as "first main resin" in some cases. The "resin solid mass of the first main resin" means the total solid amount of the first coating film-forming resin and the first curing agent. For example, 100 parts by mass of the resin solid content of the "first main resin" corresponds to 100 parts by mass of the total resin solid content of the first coating film-forming resin and the first curing agent.

(First Curing Agent)

The first base coating composition according to the present disclosure includes a first curing agent that appropriately corresponds to the type of the curable functional group which the first coating film-forming resin has.

Conventionally known curing agents can be used as the first curing agent, and examples of such curing known agents include amino resin, blocked isocyanate resin, epoxy compounds, aziridine compounds, carbodiimide compounds, and oxazoline compounds. From the viewpoints of the performances and cost of a resulting coating film, amino resin and/or blocked isocyanate resin are preferable.

The amino resin contained in the first curing agent is not particularly limited, and a water-soluble melamine resin and/or a water-insoluble melamine resin can be used.

The blocked isocyanate resin can be prepared by adding a blocking agent having an active hydrogen to polyisocyanate such as trimethylene diisocyanate, hexamethylene diisocyanate, xylylene diisocyanate, and isophorone diisocyanate. Such a blocked isocyanate resin, upon heating, dissociates a blocking agent and generates an isocyanate group and this group reacts with a functional group in a resin component to cure the resin.

The blending amount of the first curing agent is preferably 5 parts by mass or more and 50 parts by mass or less, for example, 5 parts by mass or more and 40 parts by mass or less, based on 100 parts by mass of the resin solid content of the first main resin (the first coating film-forming resin and the first curing agent). Thanks to the condition that the blending amount of the first curing agent is within such a range, sufficient coating film curability is obtained.

(First Inorganic Brightener)

The first inorganic brightener is one or more agents selected from the group consisting of silica, talc, calcium carbonate, kaolin, barium sulfate, and diatomaceous earth. Because of containing the first inorganic brightener, the first base coating composition can improve the luster of the entire multilayer coating film, and can form a multilayer coating film having superior design, for example, superior metallic feeling.

Although it should not be construed as being limited to a particular theory, when the second base coating composition is applied onto the coating film (first base coating film) formed by the first base coating composition, the first inorganic brightener tends to adsorb the solvent contained in the second base coating composition. Since the second luster material moves with the movement of the solvent, the orientation thereof is enhanced. Furthermore, since the viscosity of the second base coating composition increases, the orientation of the second luster material is easily maintained. As a result, the orientation of the second luster material in the second base coating film is improved. By virtue of the improvement in orientation of the luster pigment, a superior metallic coating film with suppressed diffuse reflection can be formed.

Furthermore, the first inorganic brightener can contribute to suppression of phase mixture between the first base coating film and the second base coating film. When the phase mixture is suppressed, deterioration of the appearance of the coating film is suppressed, and coating film physical properties such as chipping resistance can be kept more favorably.

In one embodiment, the first inorganic brightener includes an inorganic brightener having a positively charged surface. Thereby, for example, in addition to the above effects, the orientation of the first luster material contained in the first base coating composition can be further improved.

Furthermore, in an embodiment in which the first base coating composition includes the first luster material, the first inorganic brightener can promote uniform dispersion of the first luster material, and can suppress localization of the first luster material. Furthermore, the first inorganic brightener can suppress unevenness of the first base coating film.

In addition, the first inorganic brightener can impart impact stress dispersibility to the first base coating film according to the present disclosure. Therefore, for example, the first base coating film formed from the first base coating composition with a prescribed composition can have good chipping resistance.

In one embodiment, the first inorganic brightener includes an inorganic brightener having a positively charged surface, and for example, the first inorganic brightener includes barium sulfate.

For example, by virtue of the inclusion of barium sulfate in the first inorganic brightener, phase mixture with the second base coating composition can be more effectively suppressed. In addition, since the second base coating composition in which phase mixture is suppressed contains the specific second inorganic rheology control agent according to the present disclosure, cohesive force (structuralization) is generated in the second base coating film, and orientation disorder of the second luster material is more effectively prevented.

As described above, in one embodiment, the effect of preventing the phase mixture of the first base coating film and the second base coating film is further enhanced by virtue of the inclusion of barium sulfate in the first inorganic brightener, so that the orientation disorder of the second luster material in the second base coating film is more effectively prevented.

In one embodiment, the average primary particle size of the first inorganic brightener is 1 μm or less, for example, 0.01 μm or more and 0.8 μm or less, and for example, 0.05 μm or more and 0.5 μm or less. The average primary particle size can be measured in accordance with a known method.

The amount of the first inorganic brightener is, for example, 1 part by mass or more and 40 parts by mass or less, and for example, 5 parts by mass or more and 40 parts by mass or less, based on 100 parts by mass of the resin solid content of the first coating film-forming resin and the first curing agent. In one embodiment, the amount of the first inorganic brightener is 7 parts by mass or more and 35 parts by mass or less based on 100 parts by mass of the resin solid content. Thanks to the condition that the amount of the first inorganic brightener is within such a range, phase mixture is more easily suppressed, and a coating film having good luster can be easily formed.

(First Hydrophobic Association Rheology Control Agent)

The first hydrophobic association rheology control agent according to the present disclosure can increase the viscosity of the first base coating composition by hydrophobic interaction generated between the first hydrophobic association rheology control agent and at least one group of the hydrophobic groups possessed by at least one material constituted from the group consisting of the first coating film-forming resin, the first curing agent, and the first inorganic brightener contained in the first base coating composition. The first base coating composition contains the first hydrophobic association rheology control agent, so that coating defects such as cratering and dents of the first base coating film can be suppressed and the smoothness of the interface between the first base coating film and the second base coating film can be improved.

In addition, the orientation disorder of the first luster material in the vicinity of the interface can be suppressed and a bright multilayer coating film having a superior metallic feeling can be formed.

Examples of the first hydrophobic association rheology control agent include a polyacrylic acid-based rheology control agent with a hydrophobic monomer copolymerized, a polyurethane-based rheology control agent having a hydrophobic chain in the molecule, a urethane-urea-based rheology control agent with at least a part of the main chain being a hydrophobic urethane chain, an amide-urea-based rheology control agent with at least a part of the main chain being a hydrophobic amide chain, and other rheology control agents.

In one embodiment, the first hydrophobic association rheology control agent includes a polyurethane-based rheology control agent having a hydrophobic chain in the molecule and a urethane-urea-based rheology control agent in which at least a part of the main chain is a hydrophobic urethane chain. By virtue of containing such a hydrophobic association rheology control agent, in addition to the above-described effects, a superior anti-settling property and a superior sagging property can be exhibited in a system containing a water-borne material such as the first base coating composition.

For example, urethane-based hydrophobic association rheology control agents such as a polyurethane-based rheology control agent and a urethane-urea-based rheology control agent have a characteristic that viscosity is prone to be developed under a low shear and viscosity is less prone to be developed under a high shear, and are superior in thixotropy. Thanks to such characteristics, the first base coating composition of the present disclosure can be suitably used, for example, for spray coating. Furthermore, the first base coating film formed from the first base coating composition containing such a hydrophobic association rheology control agent can have superior water resistance and superior high-temperature water resistance.

Examples of commercially available first hydrophobic association rheology control agents include BYK-425 (urea-modified urethane compound: produced by BYK-Chemie GmbH), BYK-420 (urethane-urea compound: produced by BYK-Chemie GmbH), BYK-430 (amide-urea compound: produced by BYK-Chemie GmbH), PU 1250 (polyurethane polymer, produced by BASF), SN Thickener-660T, SN Thickener-665T (urethane-based: produced by SAN NOPCO Ltd.), RHEOLATE 216 (urethane-urea compound: produced by ELEMENTIS), PRIMAL RM-12W and PRIMAL RM-895 (urethane type: produced by The Dow Chemical Company), and DISPARLON AQ-021 (produced by Kusumoto Chemicals, Ltd.).

The first base coating composition of the present disclosure includes the first hydrophobic association rheology control agent in an amount of 0.1 parts by mass or more and 5.0 parts by mass or less, for example, 0.1 parts by mass or more and 4.0 parts by mass or less, based on 100 parts by mass of the total resin solid content of the first coating film-forming resin and the first curing agent.

Preferably, the first hydrophobic association rheology control agent is contained in an amount of 0.2 parts by mass or more and 3.5 parts by mass or less, for example, 0.2 parts by mass or more and 3.0 parts by mass or less, based on 100 parts by mass of the total resin solid content of the first coating film-forming resin and the first curing agent.

By virtue of containing the first hydrophobic association rheology control agent in such a range, it is easy to avoid the settling of the first inorganic brightener and the first luster material added as desired during the formation of the first base coating film, and also to avoid the occurrence of clouding in the first base coating film.

In addition, since the first luster material to be added as desired can be oriented more uniformly, it is easy to obtain a first base coating film and a multilayer coating film having superior design, especially, superior metallic tone. In addition, since the first base coating film can have superior water resistance and, in addition, superior high-temperature water-resistant adherability, the water resistance and high-temperature water resistance of the entire multilayer coating film can be further improved.

(First Dispersant)

The first base coating composition of the present disclosure may include a first dispersant. By virtue of containing the first dispersant, the dispersion stability of various components contained in the first base coating composition is improved.

In one embodiment, the first dispersant has a substituent that imparts dispersion stability to metal or metal oxide. When the first dispersant has such a substituent, the first dispersant can effectively cover, for example, the first inorganic brightener and the first luster material that may be added as desired, and further can increase the steric hindrance of the first inorganic brightener and the first luster material according to the magnitude of the molecular weight of the first dispersant, so that aggregation of the first inorganic brightener and the first luster material can be suppressed. In addition, such a first dispersant can enhance the dispersibility of the first inorganic brightener and the first luster material.

In one embodiment, the first dispersant may have a highly hydrophobic side chain. In this case, the first dispersant can be dissolved in, for example, an organic solvent having a solubility in water of 0.01 mass % or more and 5.0 mass % or less, such as an alcohol-based organic solvent or a glycol ether-based organic solvent. The first dispersant may be either a polymer-type dispersant or a low molecular surfactant type dispersant. For example, a polymer-type dispersant is preferable from the viewpoint of preventing aggregation of the first luster material. The polymer-type dispersant is preferably a polymer type dispersant having at least one member selected from among an anionic group, a cationic group, and a nonionic group, more preferably at least one species selected from among a polymer type dispersant having a side chain with high hydrophobicity, a polymer type dispersant having an anionic group, a polymer type dispersant having a nonionic group, and mixtures thereof. Examples of the anionic group include a phosphoric acid group and a carboxylic acid group. Examples of the nonionic group include a polyoxyalkylene group. However, the polymer type dispersant is not limited to these groups.

As described above, known polymer dispersants such as anionic, cationic, or nonionic acrylic copolymers and block copolymers can be used as the polymer-type dispersant. In one embodiment, from the viewpoint of dispersion stability, an anionic or nonionic polymer is preferable and an acrylic copolymer or block copolymer is preferable.

As the polymer-type dispersant, known dispersants can be used and commercially available products may be used. Examples thereof include the DISPERBYK series produced by BYK-Chemie GmbH, for example, DISPERBYK, DISPERBYK-194, DISPERBYK-194N, and DISPERBYK-192; and SOLSPERSE 41000, SOLSPERSE 43000, SOLSPERSE 44000, and SOLSPERSE 47000 produced by The Lubrizol Corporation. DISPERBYK-192, DISPERBYK-194N, and DISPERBYK can be preferably used.

The amount of the first dispersant may be 1 part by mass or more and 5 parts by mass or less based on 100 parts by mass of the resin solid content of the first coating film-forming resin and the first curing agent. Within such a range, the dispersion stability of various components contained in the first base coating composition is further enhanced, so that the aggregation of the components can be effectively suppressed during the step of forming the first base coating film. In one embodiment, it is possible to effectively prevent the aggregation of the first luster material and to enhance the dispersibility of the first luster material.

(First Luster Material)

In one embodiment, the first base coating composition includes at least one of a first luster material and a first inorganic rheology control agent. Depending on the required metallic feeling, the first base coating composition may include a first luster material.

The first luster material in the present disclosure is a pigment that provides metallic feeling to a coating film. In the first base coating composition, one first luster material may be used alone, or two or more first luster materials may be used in combination.

The mass concentration (PWC) (%) of the first luster material in the first base coating composition is represented by the following formula:

$$\text{PWC} = \text{(total mass of first luster material)}/[\text{(total mass of resin solid content of first coating film-forming resin and resin solid content of first curing agent)} + \text{(total mass of first luster material)}] \times 100.$$

In this case, the range of PWC may be 0% or more and 30% or less, for example, 1% or more and 30% or less, and in one embodiment, is 5% or more and 20% or less, for example, 5% or more and 15% or less. Thanks to the condition that the mass concentration of the first luster material is within the above range, the first luster material is more uniformly oriented after a coating film is formed, so that a coating film having superior brightness and being superior in design can be easily formed. Furthermore, the resulting coating film can have good base hiding property.

The first luster material may be the same luster material as the second luster material described later. In this embodiment, as the detailed description of the characteristics and the like of the first luster material, the description regarding the second luster material described later can be cited.

The first luster material may be a surface-treated luster material, for example, a luster material surface-treated for a water-borne coating composition.

In one embodiment, the surface treatment of an aluminum luster material has an advantage that gassing (generation of hydrogen gas due to oxidation of the aluminum surface by water) in the water-borne coating composition can be suppressed. Examples of the surface treatment include silica treatment (silane coupling agent coating), molybdenum treatment (molybdic acid coating), and organic treatment (resin coating).

Commercially available luster materials may be used as the first luster material and the surface-treated first luster material, and examples thereof include METALURE (registered trademark) series, SILVERSHINE (registered trademark) series, HYDROSHINE (registered trademark) series, Liquid Black, and PLISMATIC (registered trademark) series produced by ECKART, FD series, GX series, BS series, and WA series produced by Asahi Kasei Chemicals Corporation, and 46 series, 63 series, WL series, WM series, and EMERAL series produced by Toyo Aluminium K.K.

(First Inorganic Rheology Control Agent)

The first inorganic rheology control agent according to the present disclosure is preferably a layered material having a stacked structure in which a large number of inorganic crystal layers are stacked. Since the first inorganic rheology control agent having a layered structure as above swells in the first base coating composition and forms a card house structure, it imparts a moderate viscosity to the first base coating composition and affords superior coating film strength.

Examples of the shape of the primary particles of the first inorganic rheology control agent include a disk shape, a board shape, a spherical shape, a granular shape, a cubic shape, a needle shape, a rod shape and an indefinite shape; a disk shape or a board shape is preferable.

The thickness of the first inorganic rheology control agent is preferably 100 nm or less. Owing to this, the viscosity of the first base coating composition is easily controlled to within an appropriate range. The thickness of the first inorganic rheology control agent is more preferably 50 nm or less, even more preferably 10 nm or less, and particularly preferably 5 nm or less. The thickness of the first inorganic rheology control agent may be, for example, 0.1 nm or more, and may be 0.3 nm or more.

The thickness of the first inorganic rheology control agent with a shape other than a disk shape or a board shape is synonymous with the average size of the primary particles. The average size is a 50% average particle size (D50) in a volume-based particle size distribution obtained by a laser diffraction/scattering method. The thickness of the disk-shaped or board-shaped first inorganic rheology control agent is the length of the first inorganic rheology control agent in a direction perpendicular to the principal surface thereof. The same applies to the thickness of the second inorganic rheology control agent.

The inorganic rheology control agent according to the present disclosure includes silicate layered compounds (silicate minerals), halogenated minerals, oxidized minerals, carbonate minerals, borate minerals, sulfate minerals, molybdate minerals, tungstate minerals, phosphate minerals, arsenate minerals, and vanadate minerals. Such an inorganic rheology control agent provides the first base coating composition with a moderate viscosity and superior coating film strength.

For example, when the inorganic rheology control agent and the first hydrophobic association rheology control agent are used in combination, superior water resistance and high temperature water resistance can be provided to the first base coating film, and the water resistance and high-temperature water resistance of the entire multilayer coating film can be well maintained.

In one embodiment, the first inorganic rheology control agent includes a silicate layered compound.

Examples of the silicate layered compound include smectite clay minerals such as natural or synthetic hectorite, saponite, stevensite, hyderite, montmorillonite, nontrite, and bentonite, swellable mica clay minerals such as Na-type tetrasilisic fluorine mica, Li-type tetrasilisic fluorine mica, Na-type fluorine teaniolite, and Li-type fluorine teaniolite, vermiculite, kaolinite, and mixtures thereof.

Examples of commercially available inorganic rheology control agents include LAPONITE XLG (synthetic hectorite-like substance produced by BYK), LAPONITE RD (synthetic hectorite-like substance produced by BYK), LAPONITE EP (synthetic hectorite-like substance produced by BYK), LAPONITE RDS (synthetic hectorite-like substance produced by BYK), OPTIGEL WX (Na-substituted bentonite, produced by BYK), THERMABIS (synthetic hectorite-like substance, produced by Henkel Corp.), SMECTONE SA-1 (saponite-like substance produced by Kunimine Industries Co., Ltd.), BENGEL (natural bentonite sold by Hojun Co., Ltd.), KUNIPIA F (natural montmorillonite sold by Kunimine Industries Co., Ltd.), BEEGUM (natural hectorite produced by Vanderbilt Corporation, USA), DIMONITE (synthetic swellable mica, produced by Topy Industries, Ltd.), SOMASIF (synthetic swellable mica, produced by CO-OP Chemical Co., Ltd.), SWN (synthetic smectite, produced by CO-OP Chemical Co., Ltd.), and SWF (synthetic smectite, produced by CO-OP Chemical Co., Ltd.).

In one embodiment, the first base coating composition of the present disclosure contains the first inorganic rheology control agent in an amount of 0 parts by mass or more and 10 parts by mass or less, for example, 0.5 parts by mass or more and 10 parts by mass or less, based on 100 parts by mass of the total resin solid content of the first coating film-forming resin and the first curing agent (namely, based on 100 parts by mass of the total of the resin solid contents of the first coating film-forming resin and the first curing agent). In one embodiment, the first base coating composition of the present disclosure contains the first inorganic rheology control agent in an amount of 0 parts by mass or more and 10 parts by mass or less based on 100 parts by mass of the total of the resin solid contents of the first coating film-forming resin and the first curing agent.

By virtue of containing the first inorganic rheology control agent in such an amount, a coating film having good water resistance can be formed.

By virtue of containing the first inorganic rheology control agent in such a range, the settling of the first luster material added as necessary is easily avoided during the formation of the first base coating film, and a coating film having superior design, especially superior metallic tone, is easily obtained.

<Second Base Coating Composition>

The second base coating composition in the present disclosure includes a second coating film-forming resin, a second curing agent, a second luster material, a second inorganic rheology control agent, a second hydrophobic association rheology control agent, and a second dispersant.

Furthermore, the second inorganic rheology control agent includes a layered material having a stacked structure of inorganic crystal layers. In the present description, the expression "the second inorganic rheology control agent includes a layered material having a stacked structure in which a large number of inorganic crystal layers are stacked" is synonymous with "the second inorganic rheology control agent includes a layered material having a stacked structure of inorganic crystal layers."

Any water-borne coating composition set according to the present disclosure including the second base coating composition having such a prescribed composition and the prescribed first base coating composition described above can form a superior metallic coating film in which the orientation of the luster material is improved and diffuse reflection of light is suppressed. Furthermore, it can be easily applied even to an article to be coated having a complicated shape and can form a coating film with uniform beautiful metallic feeling. In addition, any water-borne coating composition set for forming a multilayer coating film according to the present disclosure can form a coating film having good physical properties such as chipping resistance, water resistance, and high-temperature water resistance. Further, there is an advantage that superior sanding-mark hiding property is provided.

Therefore, the water-borne coating composition set for forming a multilayer coating film according to the present disclosure can form a metallic multilayer coating film (sparkle multilayer coating film) having superior design and good coating film physical properties.

In one embodiment, the nonvolatile content (NV2) in the second base coating composition is 3% or more and 18% or less, and for example, (NV2) is 4% or more and 17% or less. In another embodiment, (NV2) is 5% or more and 15% or less.

The nonvolatile content (NV2) is a value calculated from [(the mass of the second base coating composition after drying)/(the mass of the second base coating composition before drying)]×100(%). The nonvolatile content can be controlled by adjusting the amount of a solvent in the second base coating composition.

Thanks to the condition that the nonvolatile content (NV2) is within the above range, the volume shrinkage ratio of the second base coating film according to the present disclosure can be maintained within a sufficient range and a multilayer coating film having good metallic feeling can be easily formed.

In addition, good coating film properties can be obtained, for example, the sagging property of the second base coating composition can be improved, and coating workability can be improved.

The nonvolatile content can be measured by the method of JIS K5601-1-2 (heating residue).

The second base coating composition according to the present disclosure can prevent the second luster material from settling and the coating composition from flowing despite its low nonvolatile content (NV2). In addition, since the second base coating composition of the present disclosure can form a thin film, the second luster material can be more uniformly oriented. Therefore, a superior metallic coating film can be easily obtained.

Furthermore, the second base coating composition according to the present disclosure can be applied without causing sagging even if the shape of the article to be coated is complicated. In addition, since the second base coating composition according to the present disclosure is water-based, it gives less load on the environment and workers.

Since the second base coating composition according to the present disclosure exhibits a low nonvolatile content (NV2) as described above, the film thickness of a coating film can be made thin and uniform. In one embodiment, the film thickness (t2) of the second base coating film is 1 µm or more and 20 µm or less, for example, 2 µm or more and less than 15 µm. In another embodiment, the film thickness of the second base coating film is 3 µm or more and 7 µm or less. In addition, when a coating film is formed from a second base coating composition having a low NV content, the second luster material can be more uniformly oriented due to volume shrinkage of the second base coating composition after application, and the coating film can have a high flip-flop property.

That is, unlike conventional water-borne coating compositions being high in NV content (for example, NV content=25%), the second base coating composition according to the present disclosure can freely form a thin film uniform in thickness and can form a coating film having a high flip-flop property.

In addition, with the water-borne coating composition set of the present disclosure, thanks to the interaction exhibited by the combination of the prescribed first base coating composition and second base coating composition according to the present disclosure, and the low nonvolatile content (NV2) of the second base coating composition, the second luster material can be more uniformly oriented and a higher flip-flop property and a lower G value (grain feeling) can be obtained.

In addition, despite having such a low NV content, the second base coating composition according to the present disclosure can prevent the phenomenon of sagging of the second base coating composition and the settling of the second luster material. Furthermore, a second base coating film and a multilayer coating film each having uniform beautiful metallic feeling can be formed even on an article to be coated having a complicated shape having many curved surfaces.

(Second Coating Film-Forming Resin)

The second coating film-forming resin in the present disclosure may include the same type of resin as the first coating film-forming resin described above, and may include different types of resins, and may be a mixture thereof. For example, the second coating film-forming resin includes the same type of resin as the first coating film-forming resin.

In one embodiment, the second coating film-forming resin is a resin having a number average molecular weight of 5,000 or more and 30,000 or less, for example, 7,000 or more and 25,000 or less. Thanks to the condition that the number average molecular weight is within such a range, good workability can be achieved, and curability suitable for the multilayer coating film according to the present disclosure can be achieved.

In one embodiment, the second coating film-forming resin has a hydroxyl value of 20 or more and 180 or less, and for example, has a hydroxyl value of 30 or more and 160 or less.

In one embodiment, the second coating film-forming resin has an acid value of 10 mg KOH/g or more and 80 mg KOH/g or less, and for example, has an acid value of 15 mg KOH/g or more and 70 mg KOH/g or less.

Thanks to the condition that the hydroxyl value and/or the acid value of the second coating film-forming resin is within such a range, the second base coating film can have sufficient water resistance, for example, superior high-temperature water resistance (80° C.). The second base coating film has good coating film curability.

Examples of the second coating film-forming resin include coating film-forming resins such as acrylic resins, polyester resins, alkyd resins, polyether resins, polyolefin resin, urethane-based resins, and melamine-based resins. These resins may be contained singly or in combination of two or more of them.

For example, it is preferable to use a first coating film-forming resin selected from among acrylic resin, polyester resin, melamine-based resin, urethane-based resin, and mixtures thereof from the viewpoints of coating film strength, weather resistance, and water resistance. For example, the second coating film-forming resin includes at least one species selected from among acrylic resins, urethane-based resins, and polyester resins.

In one embodiment, an acrylic resin and a urethane-based resin may be used in combination. In this case, an acrylic resin can be contained in an amount of 40 parts by mass or more and 60 parts by mass or less in solid content amount, and urethane-based resin can be contained in an amount of 1 part by mass or more and 20 parts by mass or less in solid content amount, based on 100 parts by mass of the total resin solid content of the second coating film-forming resin and the second curing agent.

When a plurality of species of acrylic resin are used, the sum total of the parts by mass of the respective species of acrylic resin can be appropriately adjusted to fall within the above range and when a plurality of species of urethane-based resin are used, the sum total of the parts by mass of the respective species of urethane-based resin can be appropriately adjusted to fall within the above range.

For example, the "resin solid mass of the second main resin" means the total solid amount of the second coating film-forming resin and the second curing agent. For example, 100 parts by mass of the resin solid content of the "second main resin" corresponds to 100 parts by mass of the total resin solid content of the second coating film-forming resin and the second curing agent.

(Second Curing Agent)

The second base coating composition according to the present disclosure includes a curing agent that appropriately corresponds to the type of the curable functional group which the second coating film-forming resin has. The second base coating composition may include the same type of resin as the first curing agent described above, and may include a different type of curing agent, and may be a mixture thereof. For example, the second base coating composition includes the same type of curing agent as the first curing agent.

For the type, blending amount, and the like of the second curing agent, the description regarding the first curing agent described above can be cited, and the compound, the blending amount, and the like can be appropriately chosen.

(Second Luster Material)

The second base coating composition according to the present disclosure includes a second luster material. The second luster material in the present disclosure is a pigment that provides metallic feeling to a coating film. In the second base coating composition according to the present disclosure, one second luster material may be used alone, or two or more second luster materials may be used in combination.

In the second base coating composition according to the present disclosure, the mass concentration (PWC) (%) of the second luster material in the second base coating composition is represented by the following formula:

$$PWC = (\text{total mass of second luster material})/[(\text{total mass of resin solid content of second coating film-forming resin and resin solid content of second curing agent}) + (\text{total mass of second luster material})] \times 100.$$

In this case, the range of the PWC is 5% or more and 40% or less, for example, the range of the PWC is 10% or more and 40% or less. In one embodiment, the range of the PWC is 15% or more and 40% or less, for example, 20% or more and 40% or less.

Thanks to the condition that the mass concentration of the second luster material is within the above range, the orientation of the luster pigment is easily improved, and a superior metallic coating film can be easily formed. In particular, since the present disclosure is directed to a water-borne coating composition set including the prescribed first base coating composition and the prescribed second base coating composition according to the present disclosure, the prescribed first base coating composition and the prescribed second base coating composition can interact with each other, and the second luster material is likely to be more uniformly oriented. This makes it possible to form a superior metallic coating film in which diffuse reflection of light is suppressed.

The second luster material in the present disclosure has, for example, an average particle size (D50) of 3 μm or more and 25 μm or less. In another embodiment, the average particle size may be 3 μm or more and 20 μm or less, for example, 5 μm or more and 18 μm or less. The average particle size can be usually measured using a wet flow-type particle size and shape analyzer, and can be measured using, for example, FPIA-3000S (manufactured by SYSMEX Corporation).

The second luster material in the present disclosure may have an average thickness of 3 μm or less, for example, is 1 μm or less. In one embodiment, the second luster material has a thickness of 500 nm or less, for example, 250 nm or less, and in one embodiment, 100 nm or less.

Preferably, the second luster material has an average thickness of 10 nm or more, for example, 20 nm or more. Here, the average thickness of the luster material can be calculated from the water surface diffusion (covering) area of JIS K 5906.

Thanks to the condition that the second luster material has a thickness within such a range and is contained in the second base coating composition according to the present disclosure, the second luster material is likely to be more uniformly oriented along with the volume shrinkage of the second base coating composition after application. Therefore, it is possible to easily form a coating film that is superior in metallic feeling and exhibits a high flip-flop property.

In addition, thanks to the condition that the second luster material has a thickness within the above range, scattering of light in the visible light region by the luster material edge of the overlapping portion of luster materials hardly occurs, so that a dense design (smooth design) with a low grain feeling can be realized, and a high metallic feeling can be obtained.

Therefore, the second base coating film and the multilayer coating film exhibit a low graininess value, have a low grain feeling, and have a dense design.

In one embodiment, the second luster material has a scaly shape. For example, the aspect ratio of the second luster material may be 5 or more and 2000 or less, and may be 10 or more and 2000 or less.

In another embodiment, the aspect ratio of the second luster material is 10 or more and 1000 or less, for example, 10 or more and 800 or less.

By virtue of containing the second luster material having such a shape, the second luster material is likely to be uniformly oriented along with the volume shrinkage of the second base coating composition after application. Therefore, it is possible to easily form a coating film having superior metallic feeling and being to exhibit a high flip-flop property. In addition, an adverse effect on the adherability between an article to be coated and a coating film is less likely to occur.

In particular, since the present disclosure is directed to a water-borne coating composition set including the prescribed first base coating composition and the prescribed second base coating composition, the orientation of the second luster material can be made more uniform due to the interaction between the prescribed first base coating composition and the prescribed second base coating composition.

Therefore, it is possible to easily form a coating film with superior metallic feeling on which diffuse reflection of light is suppressed.

When a commercially available product is used as the second luster material, the aspect ratio may be indicated by an average aspect ratio. The average aspect ratio of the second luster material is merely required to fall within the above range.

In one embodiment, the second luster material has a thickness of 10 nm or more and 250 nm or less and an aspect ratio of 10 or more and 1000 or less. In another embodiment, the second luster material has a thickness of 10 nm or more and 150 nm or less and an aspect ratio of 10 or more and 1000 or less.

In still another embodiment, the second luster material has a thickness of 10 nm or more and less than 150 nm and an aspect ratio of 10 or more and 800 or less.

By virtue of such a shape of the second luster material, it is possible to easily form a second base coating film and a multilayer coating film that have superior metallic feeling and exhibit high flip-flop properties. Further, scattering of visible light can be suppressed, and a high metallic feeling of the second base coating film and the multilayer coating film can be obtained. In addition, it is possible to easily form the second base coating film and the multilayer coating film which exhibit a low graininess value and have a low grain feeling and a dense design (smooth design).

The second luster material may include a pigment selected from among a metal flake, a metal oxide flake, a pearl pigment, and mixtures thereof; Examples of the metal flake include aluminum, chromium, gold, silver, copper, brass, titanium, nickel, nickel chromium, and stainless steel. Examples of the metal oxide flake include oxides of the aforementioned metal flakes, for example, alumina, chromium oxide, and mica.

In one embodiment, the second luster material includes a surface-treated luster material.

For example, in order to prevent a metal flake, a metal oxide flake, pearl pigment, etc. from reacting with water to generate gas, metal coating, e.g. a coating of a metal compound such as molybdic acid, chromic acid, yttrium and a rare earth metal, or an organic polymer coating, e.g. a coating of an organic polymer prepared using a polymerizable monomer, may be formed on the metal flake, the metal oxide flake, and the pearl pigment.

For example, the luster material such as a metal flake, a metal oxide flake, and pearl may have a coating film containing silicon dioxide, zirconium oxide, aluminum oxide, chromium oxide, polymerized synthetic resins, vanadium oxides, molybdenum oxides and/or molybdenum peroxides, phosphates, phosphites, borates, chromates, and mixtures or combinations thereof.

For example, in the case of using chromium oxide or the like, toxicity can be removed by using a chemically inactivated material.

The second luster material may include a vapor-deposited metal pigment. Such a second luster material is commonly prepared by vapor depositing a metal thin film (metal oxide thin film) on a base film, peeling off the base film, and then pulverizing the deposited metal film into metal flakes (metal oxide flakes).

The metal material to be deposited is not particularly limited and, for example, the materials described for the metal flake and the metal oxide flake can be used. Preferably, the second luster material includes vapor-deposited aluminum pigment, vapor-deposited chromium pigment, vapor-deposited alumina pigment, and vapor-deposited chromium oxide pigment. The vapor-deposited metal pigment may, if desired, have a coating like that described above on the surface thereof.

The second luster material may be, for example, a luster material surface-treated for a water-borne coating composition.

In one embodiment, the surface treatment of the aluminum luster material can suppress gassing (generation of hydrogen gas due to oxidation of the aluminum surface by water) in the water-borne coating composition. Examples thereof include silica treatment (silane coupling agent coating), molybdenum treatment (molybdic acid coating), and organic treatment (resin coating). Commercially available luster materials may be used as the second luster material and the surface-treated second luster material, and examples thereof include METALURE (registered trademark) series, SILVERSHINE (registered trademark) series, HYDROSHINE (registered trademark) series, Liquid Black (registered trademark), and PLISMATIC (registered trademark) series produced by ECKART, FD series, GX series, BS series, and WA series produced by Asahi Kasei Chemicals Corporation, and 46 series, 63 series, WL series, WM series, and EMERAL series produced by Toyo Aluminium K.K.

(Second Inorganic Rheology Control Agent)

The second inorganic rheology control agent in the present disclosure includes a layered material having a stacked structure in which a large number of inorganic crystal layers are stacked. Since the second inorganic rheology control agent having such a layered structure swells in the second base coating composition and forms a card house structure, it imparts a moderate viscosity to the second base coating composition and affords superior coating film strength.

Furthermore, the second inorganic rheology control agent favorably maintains the orientation of the second luster material. Although it should not be construed as being limited to a particular theory, the second inorganic rheology control agent imparts thixotropy to the second base coating composition. As described above, when the second base coating composition is applied to the first base coating film, movement of a solvent may occur. However, since the second base coating composition is provided with thixotropic property due to the second inorganic rheology control agent, the viscosity thereof in a low shear region is low and the orientation of the second luster material is well maintained. As a result, a superior metallic coating film in which diffuse reflection of light is suppressed can be formed.

In addition, although it should not be construed as being limited to a particular theory, it is considered that because of the inclusion of the second inorganic rheology control agent in the second base coating composition, structuralization occurs due to interaction between the luster material (for example, aluminum) and the second inorganic rheology control agent, and orientation disorder due to cohesive force (structuralization) of the second base coating composition is also prevented. In addition, the stability of the second base coating composition having a high PWC of the luster material can be enhanced.

Furthermore, the second inorganic rheology control agent can contribute to suppression of phase mixture between the first base coating film and the second base coating film. When the phase mixture is suppressed, deterioration of the appearance of the coating film is suppressed, and coating film physical properties such as chipping resistance can be kept more favorably.

Examples of the shape of the primary particles of the second inorganic rheology control agent include a disk shape, a board shape, a spherical shape, a granular shape, a cubic shape, a needle shape, a rod shape and an indefinite shape; a disk shape or a board shape is preferable.

The thickness of the second inorganic rheology control agent is preferably 100 nm or less. This makes it easier to prevent the disorder of the orientation of the luster material. The thickness of the second inorganic rheology control agent is more preferably 50 nm or less, even more preferably 10 nm or less, and particularly preferably 5 nm or less. The thickness of the second inorganic rheology control agent may be, for example, 0.1 nm or more, and may be 0.3 nm or more.

Examples of the second inorganic rheology control agent in the present disclosure include silicate layered compounds (silicate minerals), halogenated minerals, oxidized minerals, carbonate minerals, borate minerals, sulfate minerals, molybdate minerals, tungstate minerals, phosphate minerals, arsenate minerals, and vanadate minerals.

In one embodiment, the second inorganic rheology control agent includes a silicate layered compound. By virtue of containing the silicate layered compound, a moderate viscosity and superior coating film strength can be imparted to the second base coating composition. In addition, the second base coating film formed from the second base coating composition can have superior water resistance and also have superior high-temperature water resistance (80° C.) by virtue of using the second inorganic rheology control agent and a second hydrophobic association rheology control agent described later in combination.

Examples of the silicate layered compound include smectite clay minerals such as natural or synthetic hectorite, saponite, stevensite, hyderite, montmorillonite, nontrite, and bentonite, swellable mica clay minerals such as Na-type tetrasilisic fluorine mica, Li-type tetrasilisic fluorine mica, Na-type fluorine teaniolite, and Li-type fluorine teaniolite, vermiculite, kaolinite, and mixtures thereof.

In one embodiment, the silicate layered compound includes at least one smectite clay mineral selected from the group consisting of natural or synthetic hectorite, saponite, stevensite, hyderite, montmorillonite, nontrite, and bentonite.

In another aspect, the silicate layered compound includes at least one smectite clay mineral selected from the group consisting of hectorite, saponite, montmorillonite, and bentonite.

Since the silicate layered compound contains such a mineral, although it should not be construed as being limited to a particular theory, but for example, it is considered that the orientation of the second luster material in the second base coating film can be improved by a synergistic effect with a prescribed component contained in the first base coating composition such as the first inorganic brightener described above, and furthermore, phase mixture that can occur between the first base coating film and the second base coating film can be more effectively suppressed.

As a result, the orientation of the luster pigment is improved, so that a superior metallic coating film with suppressed diffuse reflection can be formed. Further, the deterioration of the appearance of the coating film due to phase mixture can be suppressed, and coating film physical properties such as chipping resistance can be kept favorably.

Examples of commercially available second inorganic rheology control agents include LAPONITE XLG (synthetic hectorite-like substance produced by BYK), LAPONITE RD (synthetic hectorite-like substance produced by BYK), LAPONITE RDS (synthetic hectorite-like substance produced by BYK), LAPONITE EP (synthetic hectorite-like substance produced by BYK), OPTIGEL WX (Na-substituted bentonite, produced by BYK), THERMABIS (synthetic hectorite-like substance, produced by Henkel Corp.), SMECTONE SA-1 (saponite-like substance produced by Kunimine Industries Co., Ltd.), BENGEL (natural bentonite sold by Hojun Co., Ltd.), Kunipia F (natural montmorillonite sold by Kunimine Industries Co., Ltd.), BEEGUM (natural hectorite produced by Vanderbilt Corporation, USA), DIMONITE (synthetic swellable mica, produced by Topy Industries, Ltd.), SOMASIF (synthetic swellable mica, produced by CO-OP Chemical Co., Ltd.), SWN (synthetic smectite, produced by CO-OP Chemical Co., Ltd.), and SWF (synthetic smectite, produced by CO-OP Chemical Co., Ltd.).

In one embodiment, the second base coating composition of the present disclosure contains the second inorganic rheology control agent in an amount of 1 part by mass or more and 7 parts by mass or less based on 100 parts by mass of the total resin solid content of the coating film-forming resin and the curing agent.

In one embodiment, the second base coating composition according to the present disclosure preferably contains the second inorganic rheology control agent in an amount of 1 part by mass or more and 7 parts by mass or less, for example, more preferably in an amount of 2 parts by mass or more and 7 parts by mass or less, and even more preferably in an amount of 2 parts by mass or more and 5 parts by mass or less, based on 100 parts by mass of the total resin solid content of the coating film-forming resin and the curing agent.

By virtue of containing the second inorganic rheology control agent in such a range, it is easy to avoid the settling of the second luster material during the formation of the second base coating film and avoid the occurrence of clouding in the second base coating film. In addition, phase mixture that may be generated between the first base coating film and the second base coating film can be more effectively suppressed.

In addition, since the second luster material can be uniformly oriented, a second base coating film having superior design, especially a superior metallic tone, can be obtained.

For example, the second base coating composition includes the second inorganic rheology control agent and the second hydrophobic association rheology control agent in a prescribed relationship.

In one embodiment, the second base coating composition contains the second inorganic rheology control agent in an amount of 1 part by mass or more and 7 parts by mass or less based on 100 parts by mass of the total resin solid content of the second coating film-forming resin and the second curing agent. Furthermore, the second base coating composition includes the second hydrophobic association rheology control agent described later in an amount of 1 part by mass or more and 15 parts by mass or less, for example, 1 part by mass or more and less than 15 parts by mass, based on 100 parts by mass of the total resin solid content of the second coating film-forming resin and the second curing agent.

The second base coating composition may contain the second inorganic rheology control agent in an amount of 2 parts by mass or more and 7 parts by mass or less, for example, 2 parts by mass or more and 5 parts by mass or less.

Thanks to the condition that the second base coating composition of the present disclosure includes the second inorganic rheology control agent and the second hydrophobic association rheology control agent in the prescribed parts by mass, respectively, based on 100 parts by mass of the total resin solid content of the coating film-forming resin and the curing agent as described above, the second base coating composition of the present disclosure can effectively avoid the settling of the second luster material during the formation of a coating film and avoid the occurrence of clouding in the second base coating film. Further, since the orientation of the second luster material can be made uniform, a coating film having superior design can be easily obtained. In addition, the second base coating film has superior water resistance, and can also have superior high-temperature water resistance (80° C.).

In the second base coating composition of the present disclosure, the content ratio (mass ratio) of the second inorganic rheology control agent to the second hydrophobic association rheology control agent is not particularly limited as long as the second inorganic rheology control agent and the second hydrophobic association rheology control agent are used in combination. For example, the content ratio (mass ratio) of the second inorganic rheology control agent to the second hydrophobic association rheology control agent may be the second inorganic rheology control agent/ the second hydrophobic association rheology control agent=1/1 to 5/1, and in another embodiment, may be the second inorganic rheology control agent/the second hydrophobic association rheology control agent=1/1 to 1/5.

In one embodiment, in the water-borne coating composition set according to the present disclosure, the amount of the first inorganic brightener based on 100 parts by mass of the total resin solid content of the first coating film-forming resin and the first curing agent is smaller than the amount of the second inorganic rheology control agent based on 100 parts by mass of the total resin solid content of the second coating film-forming resin and the second curing agent.

Thanks to the condition that the water-borne coating composition set according to the present disclosure includes the second inorganic rheology control agent and the first inorganic brightener in such a relationship, it is possible to form a coating film having metallic feeling further superior in design, and also possible to obtain a multilayer coating film having further improved coating film properties such as chipping resistance, water resistance, and high-temperature water resistance, and having superior sanding-mark hiding property.

(Second Hydrophobic Association Rheology Control Agent)

The second hydrophobic association rheology control agent according to the present disclosure can increase the viscosity of the second base coating composition by hydrophobic interaction generated between the second hydrophobic association rheology control agent and at least one group of the hydrophobic groups possessed by at least one material constituted from the group consisting of the second coating film-forming resin, the second curing agent, the second luster material, the second inorganic rheology control agent, and the second dispersant contained in the second base coating composition.

By virtue of containing the second hydrophobic association rheology control agent, coating defects such as cratering and dents of the second base coating film can be suppressed and high smoothness can be obtained between the second base coating film and the first base coating film.

Since the second base coating composition includes the second inorganic rheology control agent and the second hydrophobic association rheology control agent, it is possible to more effectively avoid the settling of the second luster material during the formation of a coating film and avoid the occurrence of clouding in the second base coating film. Further, since the second luster material can be oriented uniformly, a coating film having superior design can be obtained. In addition, the second base coating film has superior water resistance, and can have superior high-temperature water resistance (80° C.).

Examples of a particularly preferable second hydrophobic association rheology control agent include a polyacrylic acid-based rheology control agent with a hydrophobic monomer copolymerized, a polyurethane-based rheology control agent having a hydrophobic chain in the molecule, a urethane-urea-based rheology control agent with at least a part of the main chain being a hydrophobic urethane chain, an amide-urea-based rheology control agent with at least a part of the main chain being a hydrophobic amide chain, and other rheology control agents.

In one embodiment, the second hydrophobic association rheology control agent includes a polyurethane-based rheology control agent having a hydrophobic chain in the molecule and a urethane-urea-based rheology control agent in which at least a part of the main chain is a hydrophobic urethane chain. By virtue of containing such a second hydrophobic association rheology control agent, in addition to the above-described effects, a superior anti-settling property and a superior sagging property can be exhibited in a system containing a water-borne material such as the second base coating composition.

For example, urethane-based hydrophobic association rheology control agents such as a polyurethane-based rheology control agent and a urethane-urea-based rheology control agent have a characteristic that viscosity is prone to be developed under a low shear and viscosity is less prone to be developed under a high shear, and are superior in thixotropy. Thanks to such characteristics, the second base coating composition of the present disclosure can be suitably used, for example, for spray coating. Furthermore, the second base coating film formed from the second base coating composition containing such a hydrophobic association rheology control agent can have superior water resistance and superior high-temperature water resistance.

Examples of commercially available second hydrophobic association rheology control agents include BYK-425 (urea-modified urethane compound: produced by BYK-Chemie GmbH), BYK-420 (urethane-urea compound: produced by BYK-Chemie GmbH), BYK-430 (amide-urea compound: produced by BYK-Chemie GmbH), PU 1250 (polyurethane polymer, produced by BASF), SN Thickener-660T, SN Thickener-665T (urethane-based: produced by SAN NOPCO Ltd.), RHEOLATE 216 (urethane-urea compound: produced by ELEMENTIS), PRIMAL RM-12W and PRIMAL RM-895 (urethane type: produced by The Dow Chemical Company), and DISPARLON AQ-021 (produced by Kusumoto Chemicals, Ltd.).

The water-borne coating composition of the present disclosure includes the second hydrophobic association rheology control agent in an amount of 1 part by mass or more and 15 parts by mass or less, for example, 1 part by mass or more and less than 15 parts by mass, based on 100 parts by mass of the total resin solid content of the second coating film-forming resin and the second curing agent. In one embodiment, the second hydrophobic association rheology control agent is contained in an amount of 2 parts by mass or more and 15 parts by mass or less, for example, 2 parts by mass or more and less than 15 parts by mass, in an amount of 2 parts by mass or more and 10 parts by mass or less in one embodiment, or in an amount of 2 parts by mass or more and 5 parts by mass or less in another embodiment, based on 100 parts by mass of the total resin solid content of the second coating film-forming resin and the second curing agent.

By virtue of containing the second hydrophobic association rheology control agent in such a range, it is possible to more effectively avoid the settling of the second luster material during the formation of the second base coating film and avoid the occurrence of clouding in the second base coating film. In addition, since the second luster material can be uniformly oriented, a coating film having superior design, especially a superior metallic tone, can be easily obtained. Furthermore, by virtue of incorporating a prescribed second hydrophobic association rheology control agent in a prescribed amount, the second base coating film and the multilayer coating film can have superior water resistance, and superior high-temperature water-resistant adherability.

(Second Inorganic Brightener)

The second base coating composition may include a second inorganic brightener, as necessary. The second inorganic brightener may be the same type as or different from the first inorganic brightener.

For example, the second inorganic brightener is one or more agents selected from the group consisting of silica, talc, calcium carbonate, kaolin, barium sulfate, and diatomaceous earth.

In one embodiment, the first inorganic brightener includes an inorganic brightener having a positively charged surface, and for example, includes barium sulfate. As the second inorganic brightener, those described in the first inorganic brightener can be used. By virtue of containing the second inorganic brightener, the luster of the second base coating film can be adjusted to a desired range.

In one embodiment, the second base coating composition may include a second inorganic brightener of the same type as the first inorganic brightener. Although it should not be construed as being limited to a particular theory, when the first inorganic brightener and the second inorganic brightener are of the same type, interference unevenness based on a difference in refractive index that can occur between the second base coating film and the first base coating film can be further reduced.

The second base coating composition may include the second inorganic brightener in an amount of 0.01 parts by mass or more and less than 10 parts by mass, for example, may include in an amount of 0.01 parts by mass or more and 5 parts by mass or less, based on 100 parts by mass of the total resin solid content of the second coating film-forming resin and the second curing agent. In one embodiment, the second inorganic brightener is contained in an amount of less than 0.1 parts by mass, for example, may be contained in an amount of 0.01 parts by mass or more and less than 0.1 parts by mass, based on 100 parts by mass of the resin solid content. By virtue of containing the second inorganic brightener in such a range, a superior metallic coating film can be formed.

Here, in the present disclosure, the blending amount of the second inorganic brightener can be selected according to the type (for example, size and thickness) of the luster material contained in the second base coating composition, and the design can be further improved.

In one embodiment, the second base coating composition may include a second inorganic brightener.

In an embodiment in which the second base coating composition includes the second inorganic brightener, where an amount of the first inorganic brightener contained in the first base coating composition based on 100 parts by mass of a total resin solid content of the first coating film-forming resin and the first curing agent is represented by (Am1), and an amount of the second inorganic brightener contained in the second base coating composition based on 100 parts by mass of a total resin solid content of the second coating film-forming resin and the second curing agent is represented by (Am2), a ratio (Am1)/(Am2) of (Am1) to (Am2) is preferably 2.0 or more.

By virtue of having such a relationship, interference unevenness based on the refractive index difference that may occur between the second base coating film and the first base coating film can be further reduced.

(Second Dispersant)

The second base coating composition of the present disclosure includes a second dispersant.

By virtue of containing the second dispersant, the dispersion stability of various components contained in the second base coating composition is improved.

In one embodiment, the second dispersant has a substituent that imparts dispersion stability to metal or metal oxide. When the condition that the second dispersant has such a substituent, the second dispersant can effectively cover the second luster material, and further can increase the steric hindrance of the second luster material according to the magnitude of the molecular weight of the second dispersant, so that aggregation of the second luster material can be suppressed. In addition, such a second dispersant can enhance the dispersibility of the second luster material.

In one embodiment, the second dispersant may have a highly hydrophobic side chain. When the second dispersant has a side chain with high hydrophobicity, the second dispersant can be dissolved also in a solvent such as 2-ethylhexyl alcohol (2EHOH) and monoethylene glycol mono-2-ethylhexyl ether (EHG).

The second dispersant may be either a polymer-type dispersant or a low molecular surfactant type dispersant. For example, a polymer-type dispersant is preferable from the viewpoint of preventing aggregation of the second luster material. The polymer-type dispersant is preferably a polymer type dispersant having at least one member selected from among an anionic group, a cationic group, and a nonionic group, more preferably at least one species selected from among a polymer type dispersant having a side chain with high hydrophobicity, a polymer type dispersant having an anionic group, a polymer type dispersant having a nonionic group, and mixtures thereof. Examples of the anionic group include a phosphoric acid group and a carboxylic acid group. Examples of the nonionic group include a polyoxyalkylene group. However, the polymer type dispersant is not limited to these groups.

As described above, known polymer dispersants such as anionic, cationic, or nonionic acrylic copolymers and block copolymers can be used as the polymer-type dispersant. In one embodiment, from the viewpoint of dispersion stability, an anionic or nonionic polymer is preferable and an acrylic copolymer or block copolymer is preferable.

As the polymer-type dispersant, known dispersants can be used and the commercially available products described for the first dispersant may be contained.

The amount of the second dispersant may be 1 part by mass or more and 15 parts by mass or less based on 100 parts by mass of the total resin solid content of the second coating film-forming resin and the second curing agent. In one embodiment, the amount of the second dispersant is 1 part by mass or more and 12 parts by mass or less, and for example, 3 parts by mass or more and 12 parts by mass or less, based on 100 parts by mass of the total resin solid content of the second coating film-forming resin and the second curing agent.

Thanks to the condition that the amount of the second dispersant is within such a range, the dispersion stability of various components contained in the second base coating composition is enhanced, so that the aggregation of the components can be suppressed during the step of forming the second base coating film. In addition, it is possible to more effectively prevent the aggregation of the second luster material and to enhance the dispersibility of the second luster material.

<Organic Solvent>

At least one of the first base coating composition and the second base coating composition according to the present disclosure may include an organic solvent. For example, an alcoholic organic solvent having a solubility in water of 0.01% by mass or more and 5.0% by mass or less and a boiling point of 160° C. or higher and 200° C. or lower and, if necessary, a glycol ether-based organic solvent having a solubility in water of 0.01% by mass or more and 5.0% by mass or less and a boiling point of 205° C. or higher and 240° C. or lower may be contained. Known solvents may be used in combination or may be used alone. The aforementioned solubility is the mass of an organic solvent soluble in 100 parts by mass of water at 20° C., expressed in percentage.

Furthermore, the first base coating composition and the second base coating composition may include the same type of organic solvent.

Thanks to the condition that the solubility in water of the alcoholic organic solvent is within the above range, there is an advantage that coating material viscosity and coating workability can be more favorably adjusted. The solubility in water of the alcoholic organic solvent is preferably 0.05% by mass or more and 3.0% by mass or less.

Thanks to the condition that the boiling point of the alcoholic organic solvent is within the above range, there is an advantage that coating workability, especially, bubbling property, sagging property and the like can be secured within a better range. The boiling point of the alcoholic organic solvent is preferably 170° C. or higher and 190° C. or lower.

The alcoholic organic solvent (solubility, boiling point) is selected from the group consisting of heptanol (0.5% by mass, 168° C.), 2-ethylhexyl alcohol (0.1% by mass, 184° C.) and cyclohexanol (4.0% by mass, 161° C.), and from the viewpoint of the stability (particle size) of the resin aqueous dispersion, 2-ethylhexyl alcohol (2EHOH) is preferable.

The content of the alcoholic organic solvent in the water-borne coating composition is, for example, 10 parts by mass or more and 150 parts by mass or less, preferably 50 parts by mass or more and 100 parts by mass or less, based on 100 parts by mass of the total resin solid content of the coating film-forming resin and the curing agent. When the content is within such a range, the effect of preventing aggregation of the scaly pigment is easily enhanced, and coating workability such as bubbling property is easily improved.

When two or more organic solvents are used, the total amount of the organic solvents may be adjusted to fall within the above range.

When the alcoholic organic solvent is added to the water-borne coating composition, atomization at the time of coating enhances so it is possible to significantly prevent aggregation of the scaly pigment.

As necessary, a glycol ether-based organic solvent having a solubility in water of 0.01% by mass or more and 5.0% by mass or less and a boiling point of 205° C. or higher and 240° C. or lower may be added to the water-borne coating composition of the present disclosure.

When the solubility in water of the glycol ether-based organic solvent is 0.01% by mass or more and 5.0% by mass or less, it is easy to adjust the viscosity of the water-borne coating composition to a viscosity suitable for application. The solubility in water of the glycol ether-based organic solvent is preferably 0.05% by mass or more and 3.0% by mass or less.

When the boiling point of the glycol ether-based organic solvent is 205° C. or higher and 240° C. or lower, coating workability, especially bubbling property and sagging property are easily improved. The boiling point of the glycol ether-based organic solvent is preferably 210° C. or higher and 230° C. or lower.

The glycol ether-based organic solvent (solubility, boiling point) is selected from the group consisting of ethylene glycol monohexyl ether (hexyl glycol, 1.0% by mass, 208° C.), ethylene glycol mono-2-ethylhexyl ether (2-ethylhexyl glycol (EHG), 0.2% by mass, 225° C.) and dipropylene glycol monobutyl ether (5.0% by mass, 215° C.), and from the viewpoint of the stability (particle size) of acrylic emulsion or hydrophobic melamine resin aqueous dispersion, ethylene glycol mono-2-ethylhexyl ether (EHG) is preferred.

The content of the glycol ether-based organic solvent in the water-borne coating composition is, for example, 10 parts by mass or more and 150 parts by mass or less, preferably 50 parts by mass or more and 100 parts by mass or less, based on 100 parts by mass of the total resin solid content of the coating film-forming resin and the curing agent. When the content is within such a range, the effect of preventing aggregation of the scaly pigment is easily enhanced, and coating workability such as bubbling property is easily improved.

When two or more organic solvents are used, the total amount of the organic solvents may be adjusted to fall within the above range. When the water-borne coating composition of the present disclosure contains an alcohol-based organic solvent and a glycol ether-based organic solvent, the mass ratio of the alcohol-based organic solvent/the glycol ether-based organic solvent is preferably 1/1 to 3/1. When the mass ratio is within this range, an excessive decrease in coating material viscosity is suppressed, so that coating workability is improved and the stability of the coating composition over time is easily improved.

In addition, a glycol ether-based organic solvent may be added alone to the water-borne coating composition.

<Other Components>

At least one of the first base coating composition and the second base coating composition according to the present disclosure may include, in addition to the above-described components, water, an antifoaming agent, a coloring pigment, an extender pigment, an ultraviolet absorber, a hindered amine light stabilizer, an antioxidant, crosslinked resin particles, a surface conditioning agent, a film-forming assistant, a rust preventive pigment, and a rust inhibitor.

<Method for Producing Base Coating Composition>

The methods for producing the first and second base coating compositions are not particularly limited as long as the components described above can be uniformly dispersed. The first and second base coating compositions can be prepared by methods known to those skilled in the art, for example, using a kneader, a mill, a roll mill, or the like.

<First Coating Film and Second Coating Film>

From the first base coating composition according to the present disclosure can be formed a first coating film, and from the second base coating composition according to the present disclosure can be formed a second base coating film. Since the multilayer coating film having such a first base coating film and a second base coating film has high orientation of the luster material, the multilayer coating film has a superior metallic feeling with suppressed diffuse reflection of light. In addition, the multilayer coating film has superior physical properties such as chipping resistance, water resistance, and high-temperature water resistance, and workability.

Therefore, the multilayer coating film formed from the water-borne coating composition set for forming a multilayer coating film according to the present disclosure has a superior metallic feeling and good coating film physical properties.

In one embodiment, the film thickness ($t1$) of the first base coating film is 1 μm or more and 35 μm or less, for example, may be 1 μm or more and 30 μm or less, and may be 1 μm or more and 16 μm or less. The thickness may be 2 μm or more and 15 gm or less. In another embodiment, the film thickness of the first base coating film is 2.5 μm or more and 11 μm or less.

Thanks to the condition that the film thickness of the first base coating film is within such a range, a multilayer coating film which is superior especially in chipping resistance and sanding-mark hiding property and is superior in design can be formed. The film thickness is a thickness of a film heat-cured.

In one embodiment, the film thickness ($t2$) of the second base coating film is 1 gm or more and 20 μm or less, for example, 2 μm or more and less than 15 μm. In another embodiment, the film thickness of the second base coating film is 3 μm or more and 7 μm or less.

Thanks to the condition that the film thickness of the second base coating film is within such a range, a multilayer coating film which is superior in anti-sagging property and superior in design can be formed. The film thickness is a thickness of a film heat-cured.

For example, the film thickness ($t1$) of the heat-cured first base coating film formed from the first base coating composition and the film thickness ($t2$) of the heat-cured second base coating film formed from the second base coating composition have a relationship of $(t1) \geq (t2)$. By virtue of having such a relationship, it is possible to form a multilayer coating film having a more improved metallic feeling, and in addition, it is possible to form a multilayer coating film superior in physical properties such as chipping resistance as well as sanding-mark hiding property as coating workability without impairing the superior metallic feeling. Furthermore, it is possible to form a multilayer coating film superior also in water resistance and high-temperature water resistance.

<Method for Forming Multilayer Coating Film>

Furthermore, the present disclosure is directed to a method for forming a multilayer coating film using the water-borne coating composition set including the first base coating composition and the second base coating composition according to the present disclosure, the method for forming a multilayer coating film including:

a step of applying the first base coating composition to an article to be coated to form an uncured first base coating film;

a step of applying the second base coating composition to the uncured first base coating film to form an uncured second base coating film;

a step of applying a clear coating composition for forming a clear coating film to the uncured second base coating film to form an uncured clear coating film; and a step of simultaneously baking and curing the uncured first base coating film, the uncured second base coating film, and the uncured clear coating film to form a multilayer coating film, in which a heat-cured first base coating film formed from the first base coating composition has a film thickness of 1 μm or more and 35 μm or less, and a heat-cured second base coating film formed from the second base coating composition has a film thickness of 1 μm or more and 20 μm or less.

In another embodiment, the present disclosure is directed to a method for forming a multilayer coating film, the method including:

a step of applying a water-borne intermediate coating composition to an article to be coated to form an uncured intermediate coating film;

a step of applying the first base coating composition to the uncured intermediate coating film to form an uncured first base coating film;

a step of applying the second base coating composition to the uncured first base coating film to form an uncured second base coating film;

a step of applying a clear coating composition for forming a clear coating film to the uncured second base coating film to form an uncured clear coating film; and a step of simultaneously baking and curing the uncured intermediate coating film, the uncured first base coating film, the uncured second base coating film, and the uncured clear coating film to form a multilayer coating film, in which a heat-cured first base coating film formed from the first base coating composition has a film thickness of 1 μm or more and 35 μm or less, and a heat-cured second base coating film formed from the second base coating composition has a film thickness of 1 μm or more and 20 μm or less.

Before applying the water-borne coating composition according to the present disclosure to the article to be coated, an intermediate coating film may be formed. The intermediate coating film may be formed in order to improve a property of hiding the surface of an article to be coated, adherability with the article, and chipping resistance.

The thickness of the intermediate coating film is, for example, 10 μm or more and 50 μm or less in dry film thickness. The intermediate coating composition to be used for forming an intermediate coating film includes a coating film-forming component, and for example, those known in the art, e.g., one including a hydroxyl group-containing polyester resin and/or a hydroxyl group-containing acrylic resin and a melamine resin and/or a blocked polyisocyanate can be used.

These are applied, and then dried or cured at a normal temperature or by heating depending on the form of the intermediate coating composition to be used. The first base coating composition according to the present disclosure can be applied by so-called wet-on-wet application without curing the intermediate coating film.

The article to be coated according to the present disclosure is not particularly limited, and examples thereof include iron, copper, aluminum, tin, zinc, alloys containing these metals, products plated or vapor-deposited with these metals, plastics, and foams. The article to be coated may have a cured electrodeposition coating film formed on the surface thereof. The cured electrodeposition coating film is formed by electrodeposition coating an electrodeposition coating material on an article to be coated and then heat-curing it. The electrodeposition coating material is not particularly limited, and a known cationic electrodeposition coating material or anionic electrodeposition coating material can be used. The electrodeposition coating method and the heat-curing of the electrodeposition-coated coating film can be carried out by a method and under conditions commonly used for electrodeposition coating for automobile bodies.

The method for forming a multilayer coating film (a bright multilayer coating film) according to the present disclosure is preferably applied to a molded article made of these metals, for example, an external board of an automobile body.

As the clear coating composition to be used in the present disclosure, a coating composition known as a clear coating composition for an automobile body can be used. Examples of such a clear coating composition include a material containing a clear coating film-forming resin and, if necessary, a curing agent and other additives with them being dispersed or dissolved in a medium. Examples of the clear coating film-forming resin include an acrylic resin, a polyester resin, an epoxy resin, and a urethane resin. These can be used in combination with a curing agent such as an amino resin and/or an isocyanate resin. From the viewpoints of transparency or acid-resistant etching property, it is preferable to use a combination of an acrylic resin and/or a polyester resin and an amino resin, or an acrylic resin and/or a polyester resin having a carboxylic acid/epoxy curing system. For example, when the clear coating composition includes prescribed amounts of an ultraviolet absorber and a light stabilizer in addition to the resin components described above, adherability with an anticorrosive coating film is improved. To use such a clear coating composition is preferable from the viewpoint that corrosion can be prevented even in use in an area susceptible to salt damage.

The film thickness (t1) of the first base coating film is 1 μm or more and 35 μm or less, and may be, for example, 1 μm or more and 30 μm or less, or may be 1 μm or more and 16 μm or less. The film thickness (t1) of the first base coating film also may be 2 μm or more and 15 μm or less. In another embodiment, the film thickness of the first base coating film is 2.5 μm or more and 11 μm or less.

Thanks to the condition that the film thickness of the first base coating film is within such a range, a multilayer coating film which is superior especially in chipping resistance and sanding-mark hiding property and is superior in design can be formed. The film thickness is a thickness of a film heat-cured.

The film thickness of the second base coating film is 1 μm or more and 20 μm or less, for example, 2 μm or more and less than 15 μm. In another embodiment, the film thickness of the second base coating film is 3 μm or more and 7 μm or less.

Thanks to the condition that the film thickness of the second base coating film is within such a range, a multilayer coating film which is superior in anti-sagging property and superior in design can be formed. The film thickness is a thickness of a film heat-cured.

For example, the film thickness (t1) of the heat-cured first base coating film formed from the first base coating composition and the film thickness (t2) of the heat-cured second base coating film formed from the second base coating composition have a relationship of (t1)≥(t2). By virtue of having such a relationship, it is possible to form a multilayer coating film having a more improved metallic feeling, and in addition, it is possible to form a multilayer coating film superior in physical properties such as chipping resistance as well as sanding-mark hiding property as coating workability. Furthermore, it is possible to form a multilayer coating film superior also in water resistance and high-temperature water resistance.

The thin film obtained is a metallic coating film that has superior luster and a high flip-flop property (so-called FF property) and satisfies a dense feeling without a grain feeling (glare), and furthermore it has a good hiding power.

The means for applying the base coating composition of the present disclosure is not particularly limited, and examples thereof include coating methods commonly used such as immersion, brush, roller, roll coater, air spray, airless spray, curtain flow coater, roller curtain coater, and die coater. These can be appropriately selected according to the article to be coated. For example, the application of the water-borne coating composition may be carried out by using an electrostatic coating machine. Conditions such as the discharge amount of a coating film can be appropriately set according to the film thickness of a coating film required, etc.

It is preferable to conduct a step of volatilizing moisture at 40° C. or higher and 100° C. or lower for 1 minute or more and 10 minutes or less after the application of the base coating composition. By virtue of setting the curing temperature after clear coating to 80° C. or higher and 180° C. or lower, preferably 120° C. or higher and 160° C. or lower, a cured coating film having a high degree of crosslinking can be obtained. When the curing temperature is within this range, the resulting coating film is sufficiently cured whereas an excessive curing is suppressed. The curing time varies depending on the curing temperature, and is suitably 10 minutes or more and 30 minutes or less at 120° C. or higher and 160° C. or lower.

EXAMPLES

The present disclosure will be described more specifically with reference to the following examples, but the present disclosure is not limited to them. In the examples, "parts" and "%" are on a mass basis unless otherwise indicated.

Examples 1 to 37, Comparative Examples 1 to 3

<Preparation of Resin Composition 1>

Resin composition 1 (main component) contained in the first and second base coating compositions was prepared. Specifically, the following items were used.

(1) Acrylic emulsion (average particle size: 150 nm, nonvolatile content: 20%, solid acid value: 20 mg KOH/g, hydroxyl value: 40 mg KOH/g) produced by Nippon Paint Co., Ltd., 236 parts (2) 10% by mass aqueous solution of dimethylethanolamine, 10 parts (3) Water-soluble acrylic resin (nonvolatile content: 30%, solid acid value: 40 mg KOH/g, hydroxyl value: 50 mg KOH/g) produced by Nippon Paint Co., Ltd., 28.3 parts (4) "PRIMEPOL PX-1000" (bifunctional polyether polyol, number average molecular weight: 400, hydroxyl value: 278 mg KOH/g, primary/secondary hydroxyl value ratio=63/37, nonvolatile content: 100%) produced by Sanyo Chemical Industries, Ltd., 8.6 parts (5) "CYMEL 204" (mixed alkylated melamine resin, nonvolatile content: 100%) produced by Mitsui Chemicals, Inc., 21.5 parts (6) "NeoRez R-9603" (polycarbonate-based urethane emulsion, nonvolatile content: 33%) produced by Avecia, 26 parts (7) Lauryl acid phosphate, 0.2 parts (8) 2-Ethylhexanol, 60 parts (9) Mono-2-ethylhexyl ether, 30 parts In the resin composition, the total of the solid mass of the coating film-forming resin and the solid mass of the curing agent (i.e., the solid content of the main resin) was 100 parts by mass.

<Preparation of First Base Coating Composition>

The following components were blended with the resin composition 1 as shown in Table 1, and diluted with water, affording a first base water-borne coating composition.

In the table, the nonvolatile content (NV1), the PWC of the first luster material, and the PWC of the first inorganic brightener were calculated by the following formulas.

$$\text{Nonvolatile content (NV1)} = [(\text{Mass of first base coating composition after drying)/mass of first base coating composition before drying)}] \times 100(\%)$$

$$\text{Mass concentration (PWC) of first luster material} = (\text{total mass of first luster material})/[(\text{total mass of resin solid content of first coating film-forming resin and resin solid content of first curing agent)} + (\text{total mass of first luster material})] \times 100.$$

The mass concentration (PWC) of the first inorganic brightener was also calculated by replacing the first luster material in the (PWC) calculation formula of the first luster material with the first inorganic brightener.

(First Luster Material)

CP-315 (produced by Asahi Kasei Chemicals Corporation, aluminum pigment, thickness: 0.17 μm, average aspect ratio: 88)

(First Inorganic Brightener)

Barium sulfate (produced by Sakai Chemical Industry Co., Ltd., average particle size: 30 nm)

(First Hydrophobic Association Rheology Control Agent)

BYK-425 (urea-modified urethane compound, produced by BYK-Chemie GmbH, 1 part by mass based on 100 parts by mass of the solid content of the main resin)

<Preparation of Second Base Coating Composition>

The following components were blended with the resin composition 1 as shown in Table 1, and diluted with water, affording a second base water-borne coating composition.

In the tables, the nonvolatile content (NV2), the PWC of the second luster material, and the PWC of the second inorganic brightener were calculated in the same manner as the description of the preparation of the first base coating composition.

(Second Luster Material)

SB10 (produced by Asahi Kasei Chemicals Corporation, aluminum pigment, thickness: 0.06 μm, average aspect ratio: 170)

FD-508H (produced by Asahi Kasei Chemicals Corporation, aluminum pigment, thickness: 0.08 μm, average aspect ratio: 96)

FD-5090 (produced by Asahi Kasei Chemicals Corporation, aluminum pigment, thickness: 0.11 μm, average aspect ratio: 80)

WM2068 (produced by Toyo Aluminium K.K., aluminum pigment, thickness: 0.15 μm, average aspect ratio: 110)

WA3180 (produced by Asahi Kasei Chemicals Corporation, aluminum pigment, thickness: 0.25 μm, average aspect ratio: 55)

WS-3001 (produced by ECKART, aluminum pigment, thickness: 0.03 μm, average aspect ratio: 500)

(Second Inorganic Brightener)

Barium Sulfate:

BARIFINE BF-20 (produced by Sakai Chemical Industry Co., Ltd., average particle size: 30 nm)

(Second Inorganic Rheology Control Agent)

LAPONITE RD (synthetic hectorite-like substance produced by BYK-Chemie GmbH, thickness: from 0.9 nm to 1.0 nm)

LAPONITE EP (synthetic hectorite-like substance produced by BYK-Chemie GmbH, thickness: from 0.9 nm to 1.0 nm)

OPTIGEL WX (Na-substituted bentonite produced by BYK-Chemie GmbH)

In the tables, "LAPO" means LAPONITE, and "OPT" means OPTIGEL.

(Second Hydrophobic Association Rheology Control Agent)

BYK-425 (urea-modified urethane compound, produced by BYK-Chemie GmbH)

ADEKANOL UH550 (urethane compound, produced by ADEKA Corporation)

DISPARLON AQ021 (urethane compound, produced by Kusumoto Chemicals, Ltd.)

In the tables, "425" means BYK-425, "UH550" means ADEKANOL UH550, and "AQ021" means DISPARLON AQ021.

(Second Dispersant)

DISPERBYK-192 (produced by BYK-Chemie GmbH)

SURFYNOL-465 (produced by EVONIK)

SURFYNOL-440 (produced by EVONIK)

In the tables, "192" means DISPERBYK-192, "465" means SURFYNOL-465, and "440" means SURFYNOL-440.

DISPERBYK-192 is an anionic dispersant, and SURFYNOL is a nonionic dispersant (polyether adduct of acetylene diol compound).

<Production Example of Coating Film>

An SPCC-SD steel plate (dull steel plate) treated with zinc phosphate and measuring 70 mm by 150 mm by 0.8 mm thick was subjected to electrodeposition coating with a cationic electrodeposition coating material "POWERTOP U-50" produced by Nippon Paint Co., Ltd. so that a dry coating film thickness would be 20 μm. The resultant was baked at 160° C. for 30 minutes. Further, the coated sheet was further subjected to electrostatic deposition coating to have a dry film thickness of 35 pm with a gray intermediate coating material "ORGA P-30" (polyester melamine-based coating, produced by Nippon Paint Co., Ltd.), which had been diluted such that the viscosity thereof would be 25 seconds (measured at 20° C. using a No. 4 Ford cup). The resultant was baked at 140° C. for 30 minutes, and thus a substrate was prepared.

Then, the first base coating compositions of the respective Examples and Comparative Examples were applied to the obtained substrates with a Cartridge Bell (a rotary atomizing coater manufactured by ABB Industries) such that the dry film thicknesses shown in Table 1 would be achieved.

Then, following preheating at 80° C. for 3 minutes, the second base coating compositions were applied with a Cartridge Bell (a rotary atomizing coater manufactured by ABB Industries) such that the dry film thicknesses shown in Table 1 would be achieved.

Then, following preheating at 80° C. for 3 minutes, a clear coating material "MACFLOW O-1820 Clear" (epoxy curable acrylic resin-based coating, produced by Nippon Paint Co., Ltd.) was applied wet-on-wet with a rotary atomizing electrostatic coater such that a dry film thickness of 35 μm would be achieved.

After the application, baking was carried out at 140° C. for 30 minutes, affording the multilayer coating films according to the respective Examples and Comparative Examples.

<Evaluation>

Physical properties of the multilayer coating film, the first base coating composition, and the second base coating composition were evaluated based on the following criteria. The results are shown in Table 1.

(Settling Property)

A second base coating composition was placed in a 50 mL sample can and the state of settling attained after standing at room temperature for 10 days was evaluated based on the following criteria.

o: No pigment or the like has settled and no separation is observed at all.

Δ: A slight amount of pigment or the like has settled and the supernatant liquid is cloudy.

x: Pigment or the like has settled and the supernatant liquid has become transparent.

(Dispersion Stability)

250 mL of the second base coating composition obtained was placed in a 500 mL beaker, stirred at 30° C. for 7 days, and filtered through a 200 mesh filter, and then the degree of aggregation of the second luster material was evaluated.

o: The second luster material has not been aggregated.

x: The second luster material has been aggregated.

(Sagging Property)

To a coated sheet having an electrodeposited coating film and an intermediate coating film (fanned from ORGA P-30) and having a hole sized 5 mm in diameter, a first base coating composition obtained and a second base coating composition obtained were applied by using a Cartridge Bell (a rotary atomizing coater manufactured by ABB Industries) such that a dry film thicknesses shown in the following table would be achieved. After preheating at 80° C. for 3 minutes, heat-curing was performed at 140° C. for 30 minutes, and then a sagging length under the hole was measured.

The smaller the numerical value, the better the sagging property; a result with a length of 5 mm or less leads to an evaluation that the sagging property is good (○), and a result with a length of more than 5 mm is led to an evaluation that the sagging property was poor (x).

It should be noted that (Δ) means a case where the sagging property was good in one measurement and the sagging property was poor in another measurement even when the same coating composition was used.

(Hiding Property of Second Base Coating Composition)

Then, a second base coating composition obtained was applied to a black-and-white hiding test paper with a Cartridge Bell (a rotary atomizing coater manufactured by ABB Industries) such that a dry film thickness shown in the following table would be achieved. After preheating at 80° C. for 3 minutes, heat-curing was performed at 140° C. for 30 minutes. The degree of hiding of the obtained sample was visually evaluated.

A case where the base material has been hidden completely was rated as (○), and a case where the base material has shown through was rated as (x).

In addition, a hiding property of (◎) means that further improved hiding property is exhibited.

In addition, the hiding property of (Δ) means that there occurred both a case where the hiding property was (○) and a case where the hiding property was (x) at a strictly limited site even when the same coating composition was used.

(Sanding-Mark Hiding Property)

On a substrate was formed an intermediate coating film (formed from the ORGA P-30), and the intermediate coating film of the resulting coated sheet was subjected to water-sanding with #800 sandpaper for water-sanding until a 60 degree gloss reached 50%. Subsequently, a first base coating film, a second base coating film, and a clear coating film were formed on the basis of the same procedure as in the production example of the coating film described above to form a composite coating film. Thereafter, the presence or absence of transfer of the sanding mark was visually examined.

Evaluation criteria are as follows.

o: No sanding mark was observed.

Δ: Slight sanding marks were observed.

x: Sanding marks were observed on the entire surface.

(Metallic Feeling)

An electrodeposition coating film and an intermediate coating film were formed on a substrate. Further, a multilayer coating film having a first base coating film, a second base coating film, and a clear coating film was prepared thereon. For the resulting multilayer coating film, an FI value (flip-flop property) and a G value (grain feeling) were measured using a "BYK-mac i" (manufactured by BYK-Gardner) and used as the evaluation of design. The higher the flip-flop property and the denser the grain feeling, the better the metallic feeling.

◎: FI value is 20 or more and G value is 3.0 or less.

o: FI value is 20 or more and G value is 3.5 or less.

Δ: FI value is 15 or more and G value is 4.0 or less.

x: FI value is less than 15 or G value is 4.0 or more.

(Water-Resistant Adherability)

An electrodeposition coating film and an intermediate coating film were formed on a substrate. Further, a multilayer coating film having a first base coating film, a second base coating film, and a clear coating film was prepared thereon. After immersing the obtained specimen in water at 40° C. for 240 hours, the appearance of the coating film was visually observed and the adherability test described below was carried out. Evaluation criteria are as follows.

(High-Temperature Water-Resistant Adherability)

An electrodeposition coating film and an intermediate coating film were formed on a substrate. Further, a multilayer coating film having a first base coating film, a second base coating film, and a clear coating film was prepared thereon. After immersing the obtained specimen in water at 80° C. for 120 hours, the appearance of the coating film was visually observed and the adherability test described below was carried out. Evaluation criteria are as follows.

(Adherability Test)

Ten slits were cuts at 1 mm pitches in a longitudinal direction and a lateral direction, respectively, on the coating film of a specimen with a cutter, and a cellophane tape (registered trademark) (produced by Nichiban Co., Ltd.) was affixed thereon and then peeled off, and the number of peeled squares out of 100 squares was counted (also called cross-cut adhesion test). By this test, the presence or absence of delamination of the coating film was examined.

For example, when the result of the crosscut test is 100/100, this means that the peeled area of the coating film is 100%, indicating that the coating film has peeled off.

(Evaluation of Chipping Resistance)

An electrodeposition coating film and an intermediate coating film were formed on a substrate. Furthermore, a multilayer coating film having a first base coating film, a second base coating film, and a clear coating film formed from the base coating compositions of Examples and Comparative Examples was made thereon. The test board obtained was subjected to a chipping stone test under the conditions shown below using a Gravelometer KSS-1 (produced by Suga Test Instruments Co., Ltd.). (A hood of an automobile was assumed.)

<Test Methods>

Type of stone: Basalt No. 7

Stone size: 3 to 4 mm

Amount of stone: 100 g

Distance: 35 cm

Shot pressure: 0.3 MPa

Shot angle: 30°

Test temperature: −20° C.

The test board after the chipping test was evaluated visually according to the following criteria.

○: The maximum peeled part diameter is 1.0 mm or less.

Δ: The maximum peeled part diameter is more than 1.0 mm and 3.0 mm or less.

x: The maximum peeled part diameter is more than 3.0 mm.

TABLE 1

| | | | Example 1 | Example 2 | Example 3 | Example 4 | Example 5 | Example 6 |
|---|---|---|---|---|---|---|---|---|
| First base coating composition | Type of first luster material | CP-315 (thickness = 0.17 μm, aspect ratio = 88) | ○ | ○ | ○ | ○ | ○ | ○ |
| | First luster material PWC | | 10 | 10 | 10 | 10 | 10 | 10 |
| | First inorganic brightener PWC | Barium sulfate Average particle size: 30 nm | 20 | 20 | 20 | 20 | 20 | 20 |
| | NV1 | | 20 | 20 | 20 | 20 | 20 | 20 |
| Second base coating composition | Type of second luster material | SB10 (thickness = 0.06 μm, aspect ratio = 170) | ○ | | | | ○ | ○ |
| | | FD-508H (thickness = 0.08 μm, aspect ratio = 96) | | ○ | | | | |
| | | FD-5090 (thickness = 0.11 μm, aspect ratio = 80) | | | ○ | | | |
| | | WM2068 (thickness = 0.15 μm, aspect ratio =110) | | | | | | |
| | | WA3180 (thickness = 0.25 μm, aspect ratio = 55) | | | | | | |
| | | WS-3001 (thickness = 0.03 μm, aspect ratio = 500) | | | | ○ | | |
| | NV2 | | 10 | 10 | 10 | 10 | 10 | 10 |
| | Second luster material PWC | | 30 | 30 | 30 | 30 | 20 | 30 |
| | Second inorganic brightener PWC | Barium sulfate Average particle size: 30 nm | — | — | — | — | — | — |
| | Second inorganic rheology control agent | Type/amount based on 100 parts by mass of resin solid content | LAPO RD/ 5 PHR | LAPO RD/ 5 PHR | LAPO RD/ 5 PHR | LAPO RD/ 5 PHR | LAPO RD/ 5 PHR | LAPO RD/ 5 PHR |
| | Second hydrophobic association rheology control agent | Type/amount based on 100 parts by mass of resin solid content | 425/ 3 PHR | 425/ 3 PHR | 425/ 3 PHR | 425/ 3 PHR | 425/ 3 PHR | 425/ 3 PHR |
| | Anionic dispersant | Type/amount based on 100 parts by mass of resin solid content | 192/ 3 PHR | 192/ 3 PHR | 192/ 3 PHR | 192/ 3 PHR | 192/ 3 PHR | 192/ 3 PHR |
| | Nonionic dispersant | Type/amount based on 100 parts by mass of resin solid content | 465/ 10 PHR | 465/ 10 PHR | 465/ 10 PHR | 465/ 10 PHR | 465/ 10 PHR | 465/ 10 PHR |
| Film thickness configuration | First base | Dry film thickness (μm) | 7 | 7 | 7 | 7 | 7 | 7 |
| | Second base | Dry film thickness (μm) | 4 | 4 | 4 | 4 | 4 | 4 |
| Properties of Second base coating composition | Settling property | | ○ | ○ | ○ | ○ | ○ | ○ |
| | Dispersion stability | | ○ | ○ | ○ | ○ | ○ | ○ |
| Coating workability | Sagging property | | ○ | ○ | ○ | ○ | ○ | ○ |
| | Hiding property (second base) | | ○ | ○ | ○ | ○ | Δ | ○ |
| | Sanding-mark hiding property | | ○ | ○ | ○ | ○ | ○ | ○ |

TABLE 1-continued

| Metallic feeling | FI | | | 21.8 | 21.1 | 20.2 | 23.2 | 21.4 | 21.8 |
|---|---|---|---|---|---|---|---|---|---|
| | Grainness (G value) | | | 3.2 | 3.4 | 3.4 | 2.6 | 3.3 | 3.2 |
| | Evaluation | | | ○ | ○ | ○ | ⊙ | ○ | ○ |
| 40° C. Water resistance | Visual observation | | | No abnormalities | No abnormalities | No abnormalities | No abnormalities | No abnormalities | No abnormalities |
| | Adherability | | | 0/100 | 0/100 | 0/100 | 0/100 | 0/100 | 0/100 |
| 80° C. Water resistance | Visual observation | | | No abnormalities | No abnormalities | No abnormalities | No abnormalities | No abnormalities | No abnormalities |
| | Adherability | | | 0/100 | 0/100 | 0/100 | 0/100 | 0/100 | 0/100 |
| Chipping resistance | | | | ○ | ○ | ○ | ○ | ○ | ○ |

| | | | | Example 7 | Example 8 | Example 9 | Example 10 |
|---|---|---|---|---|---|---|---|
| First base coating composition | First base coating composition | Type of first luster material | CP-315 (thickness = 0.17 μm, aspect ratio = 88) | ○ | ○ | ○ | ○ |
| | | First luster material PWC | | 10 | 10 | 10 | 10 |
| | | First inorganic brightener PWC | Barium sulfate Average particle size: 30 nm | 20 | 20 | 20 | 20 |
| | | NV1 | | 20 | 20 | 20 | 20 |
| | Second base coating composition | Type of second luster material | SB10 (thickness = 0.06 μm, aspect ratio = 170) FD-508H (thickness = 0.08 μm, aspect ratio = 96) FD-5090 (thickness = 0.11 μm, aspect ratio = 80) WM2068 (thickness = 0.15 μm, aspect ratio =110) WA3180 (thickness = 0.25 μm, aspect ratio = 55) WS-3001 (thickness = 0.03 μm, aspect ratio = 500) | ○ | ○ | ○ | ○ |
| | | NV2 | | 10 | 10 | 10 | 10 |
| | | Second luster material PWC | | 40 | 30 | 30 | 30 |
| | | Second inorganic brightener PWC | Barium sulfate Average particle size: 30 nm | — | — | 5 | 10 |
| | | Second inorganic rheology control agent | Type/amount based on 100 parts by mass of resin solid content | LAPO RD/ 5 PHR | LAPO RD/ 5 PHR | LAPO RD/ 5 PHR | LAPO RD/ 5 PHR |
| | | Second hydrophobic association rheology control agent | Type/amount based on 100 parts by mass of resin solid content | 425/ 3 PHR | 425/ 3 PHR | 425/ 3 PHR | 425/ 3 PHR |
| | | Anionic dispersant | Type/amount based on 100 parts by mass of resin solid content | 192/ 3 PHR | 192/ 3 PHR | 192/ 3 PHR | 192/ 3 PHR |
| | | Nonionic dispersant | Type/amount based on 100 parts by mass of resin solid content | 465/ 10 PHR | 465/ 10 PHR | 465/ 10 PHR | 465/ 10 PHR |
| Film thickness configuration | First base | Dry film thickness (μm) | | 7 | 7 | 7 | 7 |
| | Second base | Dry film thickness (μm) | | 4 | 4 | 4 | 4 |
| Properties of Second base coating composition | Settling property | | | ○ | ○ | ○ | ○ |
| | Dispersion stability | | | ○ | ○ | ○ | ○ |
| Coating workability | Sagging property | | | ○ | ○ | ○ | ○ |
| | Hiding property (second base) | | | ○ | ○ | ○ | ○ |
| | Sanding-mark hiding property | | | ○ | ○ | ○ | ○ |
| Metallic feeling | FI | | | 18.8 | 21.8 | 20.4 | 17.6 |
| | Grainness (G value) | | | 3.6 | 3.2 | 3.4 | 3.4 |
| | Evaluation | | | Δ | ○ | ○ | Δ |
| 40° C. Water resistance | Visual observation | | | No abnormalities | No abnormalities | No abnormalities | No abnormalities |
| | Adherability | | | 0/100 | 0/100 | 0/100 | 0/100 |
| 80° C. Water resistance | Visual observation | | | No abnormalities | No abnormalities | No abnormalities | No abnormalities |
| | Adherability | | | 0/100 | 0/100 | 0/100 | 0/100 |
| Chipping resistance | | | | ○ | ○ | ○ | ○ |

TABLE 2

| | | | Example 11 | Example 12 | Comparative Example 1 | Example 13 | Example 14 |
|---|---|---|---|---|---|---|---|
| First base coating composition | Type of first luster material | CP-315 (thickness = 0.17 μm, aspect ratio = 88) | ○ | ○ | ○ | ○ | ○ |
| | First luster material PWC | | 10 | 10 | 10 | 10 | 10 |
| | First inorganic brightener PWC | Barium sulfate Average particle size: 30 nm | 20 | 20 | 20 | 20 | 20 |
| | NV1 | | 20 | 20 | 20 | 20 | 20 |
| Second base coating composition | Type of second luster material | SB10 (thickness = 0.06 μm, aspect ratio = 170) FD-508H (thickness = 0.08 μm, aspect ratio = 96) FD-5090 (thickness = 0.11 μm, aspect ratio = 80) WM2068 (thickness = 0.15 μm, aspect ratio =110) WA3180 (thickness = 0.25 μm, aspect ratio = 55) WS-3001 (thickness = 0.03 μm, aspect ratio = 500) | ○ | ○ | ○ | ○ | ○ |
| | NV2 | | 5 | 10 | 15 | 13 | 10 |
| | Second luster material PWC | | 30 | 30 | 30 | 30 | 30 |
| | Second inorganic brightener PWC | Barium sulfate Average particle size: 30 nm | — | — | — | — | — |
| | Second inorganic rheology control agent | Type/amount based on 100 parts by mass of resin solid content | LAPO RD/ 5 PHR | LAPO RD/ 5 PHR | — | LAPO RD/ 1 PHR | LAPO RD/ 5 PHR |
| | Second hydrophobic association rheology control agent | Type/amount based on 100 parts by mass of resin solid content | 425/ 3 PHR | 425/ 3 PHR | 425/ 3 PHR | 425/ 3 PHR | 425/ 3 PHR |
| | Anionic dispersant | Type/amount based on 100 parts by mass of resin solid content | 192/ 3 PHR | 192/ 3 PHR | 192/ 3 PHR | 192/ 3 PHR | 192/ 3 PHR |
| | Nonionic dispersant | Type/amount based on 100 parts by mass of resin solid content | 465/ 10 PHR | 465/ 10 PHR | 465/ 10 PHR | 465/ 10 PHR | 465/ 10 PHR |
| Film thickness configuration | First base | Dry film thickness (μm) | 7 | 7 | 7 | 7 | 7 |
| | Second base | Dry film thickness (μm) | 4 | 4 | 4 | 4 | 4 |
| Properties of second base coating composition | Settling property | | ○ | ○ | X | Δ | ○ |
| | Dispersion stability | | ○ | ○ | X | ○ | ○ |
| Coating workability | Sagging property | | ○ | ○ | ○ | ○ | ○ |
| | Hiding property (second base) | | ○ | ○ | ○ | ○ | ○ |
| | Sanding-mark hiding property | | ○ | ○ | ○ | ○ | ○ |
| Metallic feeling | FI | | 25.1 | 21.8 | 21.2 | 21.6 | 21.8 |
| | Grainness (G value) | | 3.3 | 3.2 | 3.4 | 3.2 | 3.2 |
| | Evaluation | | ○ | ○ | ○ | ○ | ○ |
| 40° C. Water resistance | Visual observation | | No abnormalities | No abnormalities | No abnormalities | No abnormalities | No abnormalities |
| | Adherability | | 0/100 | 0/100 | 10/100 | 0/100 | 0/100 |
| 80° C. Water resistance | Visual observation | | No abnormalities | No abnormalities | No abnormalities | No abnormalities | No abnormalities |
| | Adherability | | 0/100 | 0/100 | 30/100 | 0/100 | 0/100 |
| Chipping resistance | | | ○ | ○ | ○ | ○ | ○ |

| | | | Example 15 | Example 16 | Example 17 | Comparative Example 2 |
|---|---|---|---|---|---|---|
| First base coating composition | Type of first luster material | CP-315 (thickness = 0.17 μm, aspect ratio = 88) | ○ | ○ | ○ | ○ |
| | First luster material PWC | | 10 | 10 | 10 | 10 |
| | First inorganic brightener PWC | Barium sulfate Average particle size: 30 nm | 20 | 20 | 20 | 20 |
| | NV1 | | 20 | 20 | 20 | 20 |
| Second base coating composition | Type of second luster material | SB10 (thickness = 0.06 μm, aspect ratio = 170) FD-508H (thickness = 0.08 μm, aspect ratio = 96) FD-5090 (thickness = 0.11 μm, aspect ratio = 80) | ○ | ○ | ○ | ○ |

TABLE 2-continued

| | | WM2068 (thickness = 0.15 µm, aspect ratio =110) WA3180 (thickness = 0.25 µm, aspect ratio = 55) WS-3001 (thickness = 0.03 µm, aspect ratio = 500) | | | | |
|---|---|---|---|---|---|---|
| | NV2 | | 11 | 8 | 11 | 17 |
| | Second luster material PWC | | 30 | 30 | 30 | 30 |
| | Second inorganic brightener PWC | Barium sulfate Average particle size: 30 nm | — | — | — | — |
| | Second inorganic rheology control agent | Type/amount based on 100 parts by mass of resin solid content | LAPO RD/ 7 PHR | LAPO EP/ 5 PHR | Opt WX/ 5 PHR | LAPO RD/ 5 PHR |
| | Second hydrophobic association rheology control agent | Type/amount based on 100 parts by mass of resin solid content | 425/ 3 PHR | 425/ 3 PHR | 425/ 3 PHR | — |
| | Anionic dispersant | Type/amount based on 100 parts by mass of resin solid content | 192/ 3 PHR | 192/ 3 PHR | 192/ 3 PHR | 192/ 3 PHR |
| | Nonionic dispersant | Type/amount based on 100 parts by mass of resin solid content | 465/ 10 PHR | 465/ 10 PHR | 465/ 10 PHR | 465/ 10 PHR |
| Film thickness configuration | First base | Dry film thickness (µm) | 7 | 7 | 7 | 7 |
| | Second base | Dry film thickness (µm) | 4 | 4 | 4 | 4 |
| Properties of second base coating composition | Settling property | | ○ | ○ | ○ | X |
| | Dispersion stability | | ○ | ○ | ○ | X |
| Coating workability | Sagging property | | ○ | ○ | ○ | ○ |
| | Hiding property (second base) | | ○ | ○ | ○ | ○ |
| | Sanding-mark hiding property | | ○ | ○ | ○ | ○ |
| Metallic feeling | FI | | 20.2 | 20.6 | 18.8 | 14.8 |
| | Grainness (G value) | | 3.3 | 3.3 | 3.7 | 4.5 |
| | Evaluation | | ○ | ○ | Δ | X |
| 40° C. Water resistance | Visual observation | | No abnormalities | No abnormalities | No abnormalities | No abnormalities |
| | Adherability | | 0/100 | 0/100 | 0/100 | 0/100 |
| 80° C. Water resistance | Visual observation | | No abnormalities | No abnormalities | No abnormalities | No abnormalities |
| | Adherability | | 0/100 | 0/100 | 0/100 | 0/100 |
| Chipping resistance | | | ○ | ○ | ○ | ○ |

TABLE 3

| | | | Example 18 | Example 19 | Example 20 | Example 21 | Example 22 |
|---|---|---|---|---|---|---|---|
| First base coating composition | Type of first luster material | CP-315 (thickness = 0.17 µm, aspect ratio = 88) | ○ | ○ | ○ | ○ | ○ |
| | First luster material PWC | | 10 | 10 | 10 | 10 | 10 |
| | First inorganic brightener PWC | Barium sulfate Average particle size: 30 nm | 20 | 20 | 20 | 20 | 20 |
| | NV1 | | 20 | 20 | 20 | 20 | 20 |
| Second base coating composition | Type of second luster material | SB10 (thickness = 0.06 µm, aspect ratio = 170) | ○ | ○ | ○ | ○ | ○ |
| | | FD-508H (thickness = 0.08 µm, aspect ratio = 96) FD-5090 (thickness = 0.11 µm, aspect ratio = 80) WM2068 (thickness = 0.15 µm, aspect ratio = 110) WA3180 (thickness = 0.25 µm, aspect ratio = 55) WS-3001 (thickness = 0.03 µm, aspect ratio = 500) | | | | | |

TABLE 3-continued

| | | | | | | | |
|---|---|---|---|---|---|---|---|
| | NV2 | | | 15 | 10 | 7 | 10 | 12 |
| | Second luster material PWC | | | 30 | 30 | 30 | 30 | 30 |
| | Second inorganic brightener PWC | Barium sulfate Average particle size: 30 nm | | — | — | — | — | — |
| | Second inorganic rheology control agent | Type/amount based on 100 parts by mass of resin solid content | | LAPO RD/ 5 PHR | LAPO RD/ 5 PHR | LAPO RD/ 5 PHR | LAPO RD/ 5 PHR | LAPO RD/ 5 PHR |
| | Second hydrophobic association rheology control agent | Type/amount based on 100 parts by mass of resin solid content | | 425/ 1 PHR | 425/ 3 PHR | 425/ 10 PHR | UH550/ 3 PHR | AQ021/ 3 PHR |
| | Anionic dispersant | Type/amount based on 100 parts by mass of resin solid content | | 192/ 3 PHR | 192/ 3 PHR | 192/ 3 PHR | 192/ 3 PHR | 192/ 3 PHR |
| | Nonionic dispersant | Type/amount based on 100 parts by mass of resin solid content | | 465/ 10 PHR | 465/ 10 PHR | 465/ 10 PHR | 465/ 10 PHR | 465/ 10 PHR |
| Film thickness configuration | First base | Dry film thickness (μm) | | 7 | 7 | 7 | 7 | 7 |
| | Second base | Dry film thickness (μm) | | 4 | 4 | 4 | 4 | 4 |
| Properties of second base coating composition | Settling property | | | ○ | ○ | Δ | ○ | ○ |
| | Dispersion stability | | | ○ | ○ | ○ | ○ | ○ |
| Coating workability | Sagging property | | | ○ | ○ | ○ | ○ | ○ |
| | Hiding property (second base) | | | ○ | ○ | ○ | ○ | ○ |
| | Sanding-mark hiding property | | | ○ | ○ | ○ | ○ | ○ |
| Metallic feeling | FI | | | 20.4 | 21.8 | 18.4 | 21.6 | 22.4 |
| | Grainness (G value) | | | 3.4 | 3.2 | 3.8 | 3.2 | 3.2 |
| | Evaluation | | | ○ | ○ | Δ | ○ | ○ |
| 40° C. Water resistance | Visual observation | | | No abnormalities | No abnormalities | No abnormalities | No abnormalities | No abnormalities |
| | Adherability | | | 0/100 | 0/100 | 0/100 | 0/100 | 0/100 |
| 80° C. Water resistance | Visual observation | | | No abnormalities | No abnormalities | No abnormalities | No abnormalities | No abnormalities |
| | Adherability | | | 0/100 | 0/100 | 0/100 | 0/100 | 0/100 |
| Chipping resistance | | | | ○ | ○ | ○ | ○ | ○ |

| | | | Example 23 | Example 24 | Example 25 | Comparative Example 3 |
|---|---|---|---|---|---|---|
| First base coating composition | Type of first luster material | CP-315 (thickness = 0.17 μm, aspect ratio = 88) | ○ | ○ | ○ | ○ |
| | First luster material PWC | | 10 | 10 | 10 | 10 |
| | First inorganic brightener PWC | Barium sulfate Average particle size: 30 nm | 20 | 20 | 20 | — |
| | NV1 | | 20 | 20 | 20 | 20 |
| Second base coating composition | Type of second luster material | SB10 (thickness = 0.06 μm, aspect ratio = 170) | ○ | ○ | ○ | ○ |
| | | FD-508H (thickness = 0.08 μm, aspect ratio = 96) | | | | |
| | | FD-5090 (thickness = 0.11 μm, aspect ratio = 80) | | | | |
| | | WM2068 (thickness = 0.15 μm, aspect ratio = 110) | | | | |
| | | WA3180 (thickness = 0.25 μm, aspect ratio = 55) | | | | |
| | | WS-3001 (thickness = 0.03 μm, aspect ratio = 500) | | | | |
| | NV2 | | 10 | 12 | 10 | 10 |
| | Second luster material PWC | | 30 | 30 | 30 | 30 |
| | Second inorganic brightener PWC | Barium sulfate Average particle size: 30 nm | — | — | — | — |
| | Second inorganic rheology control agent | Type/amount based on 100 parts by mass of resin solid content | LAPO RD/ 5 PHR | LAPO RD/ 5 PHR | LAPO RD/ 5 PHR | LAPO RD/ 5 PHR |
| | Second hydrophobic association rheology control agent | Type/amount based on 100 parts by mass of resin solid content | 425/ 3 PHR | 425/ 3 PHR | 425/ 3 PHR | 425/ 3PHR |
| | Anionic dispersant | Type/amount based on 100 parts by mass of resin solid content | 192/ 3 PHR | 192/ 3 PHR | 192/ 3 PHR | 192/ 3PHR |

47 48

TABLE 3-continued

| | | | 465/ 10 PHR | 465/ 15 PHR | 440/ 10 PHR | 465/ 10 PHR |
|---|---|---|---|---|---|---|
| | Nonionic dispersant | Type/amount based on 100 parts by mass of resin solid content | | | | |
| Film thickness configuration | First base | Dry film thickness (μm) | 7 | 7 | 7 | 7 |
| | Second base | Dry film thickness (μm) | 4 | 4 | 4 | 4 |
| Properties of second base coating composition | Settling property | | ○ | ○ | ○ | ○ |
| | Dispersion stability | | ○ | ○ | ○ | ○ |
| Coating workability | Sagging property | | ○ | ○ | ○ | ○ |
| | Hiding property (second base) | | ○ | ○ | ○ | ○ |
| | Sanding-mark hiding property | | ○ | ○ | ○ | Δ |
| Metallic feeling | FI | | 21.8 | 21.4 | 20.6 | 16.2 |
| | Grainness (G value) | | 3.2 | 3.3 | 3.3 | 4.5 |
| | Evaluation | | ○ | ○ | ○ | X |
| 40° C. Water resistance | Visual observation | | No abnormalities | No abnormalities | No abnormalities | No abnormalities |
| | Adherability | | 0/100 | 0/100 | 0/100 | 0/100 |
| 80° C. Water resistance | Visual observation | | No abnormalities | No abnormalities | No abnormalities | No abnormalities |
| | Adherability | | 0/100 | 0/100 | 0/100 | 0/100 |
| Chipping resistance | | | ○ | ○ | ○ | ○ |

TABLE 4

| | | | Example 26 | Example 27 | Example 28 | Example 29 | Example 30 | Example 31 |
|---|---|---|---|---|---|---|---|---|
| First base coating composition | Type of first luster material | CP-315 (thickness = 0.17 μm, aspect ratio = 88) | ○ | ○ | ○ | ○ | ○ | ○ |
| | First luster material PWC | | 10 | 10 | 10 | 10 | 10 | 10 |
| | First inorganic brightener PWC | Barium sulfate Average particle size: 30 nm | 10 | 20 | 30 | 20 | 20 | 20 |
| | NV1 | | 20 | 20 | 20 | 20 | 20 | 20 |
| Second base coating composition | Type of second luster material | SB10 (thickness = 0.06 μm, aspect ratio = 170) | ○ | ○ | ○ | ○ | ○ | ○ |
| | | FD-508H (thickness = 0.08 μm, aspect ratio = 96) | | | | | | |
| | | FD-5090 (thickness = 0.11 μm, aspect ratio = 80) | | | | | | |
| | | WM2068 (thickness = 0.15 μm, aspect ratio = 110) | | | | | | |
| | | WA3180 (thickness = 0.25 μm, aspect ratio = 55) | | | | | | |
| | | WS-3001 (thickness = 0.03 μm, aspect ratio = 500) | | | | | | |
| | NV2 | | 10 | 10 | 10 | 10 | 10 | 10 |
| | Second luster material PWC | | 30 | 30 | 30 | 30 | 30 | 30 |
| | Second inorganic brightener PWC | Barium sulfate Average particle size: 30 nm | — | — | — | — | — | — |
| | Second inorganic rheology control agent | Type/amount based on 100 parts by mass of resin solid content | LAPO RD/ 5 PHR | LAPO RD/ 5 PHR | LAPO RD/ 5 PHR | LAPO RD/ 5 PHR | LAPO RD/ 5 PHR | LAPO RD/ 5 PHR |
| | Second hydrophobic association rheology control agent | Type/amount based on 100 parts by mass of resin solid content | 425/ 3 PHR | 425/ 3 PHR | 425/ 3 PHR | 425/ 3 PHR | 425/ 3 PHR | 425/ 3 PHR |
| | Anionic dispersant | Type/amount based on 100 parts by mass of resin solid content | 192/ 3 PHR | 192/ 3 PHR | 192/ 3 PHR | 192/ 3 PHR | 192/ 3 PHR | 192/ 3 PHR |
| | Nonionic dispersant | Type/amount based on 100 parts by mass of resin solid content | 465/ 10 PHR | 465/ 10 PHR | 465/ 10 PHR | 465/ 10 PHR | 465/ 10 PHR | 465/ 10 PHR |
| Film thickness configuration | First base | Dry film thickness (μm) | 7 | 7 | 7 | 7 | 7 | 7 |
| | Second base | Dry film thickness (μm) | 4 | 4 | 4 | 4 | 5 | 7 |
| Properties of second base coating composition | Settling property | | ○ | ○ | ○ | ○ | ○ | ○ |
| | Dispersion stability | | ○ | ○ | ○ | ○ | ○ | ○ |

TABLE 4-continued

| | | | | | | | | |
|---|---|---|---|---|---|---|---|---|
| Coating workability | Sagging property | | ○ | ○ | ○ | ○ | ○ | Δ |
| | Hiding property (second base) | | ○ | ○ | ○ | ○ | ○ | ○ |
| | Sanding-mark hiding property | | ○ | ○ | ○ | ○ | ○ | ○ |
| Metallic feeling | FI | | 20.2 | 21.8 | 20.6 | 21.8 | 20.4 | 18.4 |
| | Grainness (G value) | | 3.1 | 3.2 | 3.4 | 3.2 | 3.4 | 3.8 |
| | Evaluation | | Δ | ○ | ○ | ○ | Δ | Δ |
| 40° C. Waler resistance | Visual observation | | No abnormal-ities | No abnormal-ities | No abnormal-ities | No abnormal-ities | No abnormal-ities | No abnormal-ities |
| | Adherability | | 0/100 | 0/100 | 0/100 | 0/100 | 0/100 | 0/100 |
| 80° C. Water resistance | Visual observation | | No abnormal-ities | No abnormal-ities | No abnormal-ities | No abnormal-ities | No abnormal-ities | No abnormal-ities |
| | Adherability | | 0/100 | 0/100 | 0/100 | 0/100 | 0/100 | 0/100 |
| Chipping resistance | | | ○ | ○ | ○ | ○ | ○ | ○ |

| | | | Example 32 | Example 33 | Example 34 | Example 35 | Example 36 | Example 37 |
|---|---|---|---|---|---|---|---|---|
| First base coating composition | Type of first luster material | CP-315 (thickness = 0.17 μm, aspect ratio = 88) | ○ | ○ | ○ | ○ | ○ | ○ |
| | First luster material PWC | | 10 | 10 | 10 | 10 | 10 | 10 |
| | First inorganic brightener PWC | Barium sulfate Average particle size: 30 nm | 20 | 20 | 20 | 20 | 20 | 20 |
| | NV1 | | 20 | 20 | 20 | 20 | 20 | 20 |
| Second base coating composition | Type of second luster material | SB10 (thickness = 0.06 μm, aspect ratio = 170) | ○ | ○ | ○ | ○ | ○ | ○ |
| | | FD-508H (thickness = 0.08 μm, aspect ratio = 96) | | | | | | |
| | | FD-5090 (thickness = 0.11 μm, aspect ratio = 80) | | | | | | |
| | | WM2068 (thickness = 0.15 μm, aspect ratio = 110) | | | | | | |
| | | WA3180 (thickness = 0.25 μm, aspect ratio = 55) | | | | | | |
| | | WS-3001 (thickness = 0.03 μm, aspect ratio = 500) | | | | | | |
| | NV2 | | 10 | 10 | 10 | 10 | 10 | 10 |
| | Second luster material PWC | | 30 | 30 | 30 | 30 | 30 | 30 |
| | Second inorganic brightener PWC | Barium sulfate Average particle size: 30 nm | — | — | — | — | — | — |
| | Second inorganic rheology control agent | Type/amount based on 100 parts by mass of resin solid content | LAPO RD/ 5 PHR | LAPO RD/ 5 PHR | LAPO RD/ 5 PHR | LAPO RD/ 5 PHR | LAPO RD/ 5 PHR | LAPO RD/ 5 PHR |
| | Second hydrophobic association rheology control agent | Type/amount based on 100 parts by mass of resin solid content | 425/ 3 PHR | 425/ 3 PHR | 425/ 3 PHR | 425/ 3 PHR | 425/ 3 PHR | 425/ 3 PHR |
| | Anionic dispersant | Type/amount based on 100 parts by mass of resin solid content | 192/ 3 PHR | 192/ 3 PHR | 192/ 3 PHR | 192/ 3 PHR | 192/ 3 PHR | 192/ 3 PHR |
| | Nonionic dispersant | Type/amount based on 100 parts by mass of resin solid content | 465/ 10 PHR | 465/ 10 PHR | 465/ 10 PHR | 465/ 10 PHR | 465/ 10 PHR | 465/ 10 PHR |
| Film thickness configuration | First base | Dry film thickness (μm) | 3 | 5 | 7 | 10 | 12 | 15 |
| | Second base | Dry film thickness (μm) | 4 | 4 | 4 | 4 | 4 | 4 |
| Properties of second base coating composition | Settling property | | ○ | ○ | ○ | ○ | ○ | ○ |
| | Dispersion stability | | ○ | ○ | ○ | ○ | ○ | ○ |
| Coating workability | Sagging property | | ○ | ○ | ○ | ○ | ○ | Δ |
| | Hiding property (second base) | | ○ | ○ | ○ | ○ | ○ | ○ |
| | Sanding-mark hiding property | | Δ | ○ | ○ | ○ | ○ | ○ |
| Metallic feeling | FI | | 22.6 | 21.2 | 21.8 | 18.6 | 17.2 | 15.4 |
| | Grainness (G value) | | 3.5 | 3.3 | 3.2 | 3.4 | 3.7 | 3.9 |
| | Evaluation | | Δ | ○ | ○ | ○ | Δ | Δ |

TABLE 4-continued

| | | | | | | | |
|---|---|---|---|---|---|---|---|
| 40° C. Water resistance | Visual observation | | No abnormalities | No abnormalities | No abnormalities | No abnormalities | No abnormalities | No abnormalities |
| | Adherability | | 0/100 | 0/100 | 0/100 | 0/100 | 0/100 | 0/100 |
| 80° C. Water resistance | Visual observation | | No abnormalities | No abnormalities | No abnormalities | No abnormalities | No abnormalities | No abnormalities |
| | Adherability | | 0/100 | 0/100 | 0/100 | 0/100 | 0/100 | 0/100 |
| Chipping resistance | | | Δ | ○ | ○ | ○ | ○ | ○ |

With any water-borne coating composition set for forming a multilayer coating film according to the present disclosure, the orientation of a luster pigment is improved. Therefore, it is possible to form a superior metallic coating film that can suppress diffuse reflection of light and has sufficient high-light brightness.

A multilayer coating film formed from a composition set of the present disclosure is also superior in weather resistance.

In addition, any water-borne coating composition set for forming a multilayer coating film according to the present disclosure can form a coating film having good physical properties such as chipping resistance, water resistance, and high-temperature water resistance, and sanding-mark hiding property as coating workability.

Therefore, the water-borne coating composition set for forming a multilayer coating film according to the present disclosure can form a metallic multilayer coating film having superior design, especially superior metallic feeling, and good coating film physical properties.

Furthermore, since a multilayer coating film can be formed using wet-on-wet application, the number of coating film forming steps can be reduced, and an environmental load can be reduced.

On the other hand, since Comparative Example 1 does not contain the second inorganic rheology control agent according to the present disclosure, the second coating composition has poor settling property and poor dispersion stability. In addition, the obtained coating film was insufficient in both water resistance (40° C.) and high-temperature water resistance (80° C.).

In Comparative Example 2, since the second hydrophobic association rheology control agent according to the present disclosure is not contained, the second coating composition has poor settling property and poor dispersion stability. Furthermore, the metallic feeling satisfied the reference value for neither the FI value nor the G value.

In Comparative Example 3, since the first inorganic brightener was not contained, the G value did not satisfy the reference value, and the multilayer coating film was poor in metallic feeling.

INDUSTRIAL APPLICABILITY

With any water-borne coating composition set for forming a multilayer coating film according to the present disclosure, the orientation of a luster pigment is improved. Therefore, it is possible to form a superior metallic coating film that can suppress diffuse reflection of light and has sufficient high-light brightness. In addition, any water-borne coating composition set for forming a multilayer coating film according to the present disclosure can form a coating film having good physical properties such as chipping resistance, and sanding-mark hiding property as coating workability.

This application claims priority based on Japanese Patent Application No. 2019-232918, which was filed in Japan on Dec. 24, 2019, the disclosure of which application is incorporated herein by reference in its entirety.

The invention claimed is:

1. A water-borne coating composition set for forming a multilayer coating film having a first base coating film and a second base coating film, the water-borne coating composition set comprising a first base coating composition that forms the first base coating film and a second base coating composition that forms the second base coating film, wherein the first base coating composition comprises a first coating film-forming resin, a first curing agent, a first inorganic brightener, and a first hydrophobic association rheology control agent, the first inorganic brightener is at least one selected from the group consisting of silica, talc, calcium carbonate, kaolin, barium sulfate, and diatomaceous earth, the second base coating composition comprises a second coating film-forming resin, a second curing agent, a second luster material, a second inorganic rheology control agent, a second hydrophobic association rheology control agent, and a second dispersant, the second inorganic rheology control agent comprises a layered material having a stacked structure of inorganic crystal layers, a nonvolatile content NV1 in the first base coating composition is 10% or more and 45% or less, a nonvolatile content NV2 in the second base coating composition is 3% or more and 17% or less, and the nonvolatile content NV1 is greater than the nonvolatile content NV2.

2. The water-borne coating composition set for forming a multilayer coating film according to claim 1, wherein the second luster material comprises a surface-treated luster material.

3. The water-borne coating composition set for forming a multilayer coating film according to claim 1, wherein the second luster material comprises a luster material having a scaly shape and having an aspect ratio of 5 to 2000.

4. The water-borne coating composition set for forming a multilayer coating film according to claim 1, wherein the second base coating composition contains the second inorganic rheology control agent in an amount of 1 part by mass or more and 7 parts by mass or less based on 100 parts by mass of a total resin solid content of the second coating film-forming resin and the second curing agent, and the second base coating composition contains the second hydrophobic association rheology control agent in an amount of 1 part by mass or more and 15 parts by mass or less based on 100 parts by mass of a total resin solid content of the second coating film-forming resin and the second curing agent.

5. The water-borne coating composition set for forming a multilayer coating film according to claim 1, wherein the second base coating composition further comprises a second inorganic brightener, and where an amount of the first inorganic brightener contained in the first base coating composition based on 100 parts by mass of a total resin solid content of the first coating film-forming resin and the first curing agent is represented by Am1, and an amount of the second inorganic brightener contained in the second base coating composition based on 100 parts by mass of a total resin solid content of the second coating film-forming resin and the second curing agent is represented by Am2, a ratio (Am1)/(Am2) of Am1 to Am2 is 2.0 or more.

6. The water-borne coating composition set for forming a multilayer coating film according to claim 1, wherein the first base coating composition further comprises at least one of a first luster material and a first inorganic rheology control agent.

7. The water-borne coating composition set for forming a multilayer coating film according to claim 1, wherein the second coating film-forming resin comprises at least one resin selected from among an acrylic resin, a urethane-based resin, and a polyester resin.

8. The water-borne coating composition set for forming a multilayer coating film according to claim 1, wherein the second inorganic rheology control agent comprises a silicate layered compound.

9. The water-borne coating composition set for forming a multilayer coating film according to claim 1, wherein at least one of the first hydrophobic association rheology control agent and the second hydrophobic association rheology control agent comprises a urethane-based hydrophobic association rheology control agent.

10. The water-borne coating composition set for forming a multilayer coating film according to claim 1, wherein the first base coating composition further comprises a first dispersant, and at least one of the first dispersant and the second dispersant comprises a polymer-type dispersant having at least one group selected from the group consisting of an anionic group, a cationic group, and a nonionic group.

11. The water-borne coating composition set for forming a multilayer coating film according to claim 1, wherein the first inorganic brightener has a positively charged surface.

12. The water-borne coating composition set for forming a multilayer coating film according to claim 5, wherein the second inorganic brightener comprises an inorganic brightener having a positively charged surface.

13. The water-borne coating composition set for forming a multilayer coating film according to claim 6, wherein the first inorganic rheology control agent has a thickness of 100 nm or less.

14. The water-borne coating composition set for forming a multilayer coating film according to claim 1, wherein the second inorganic rheology control agent has a thickness of 100 nm or less.

15. A method for forming a multilayer coating film using the water-borne coating composition set for forming a multilayer coating film according to claim 1, the method for forming a multilayer coating film comprising:

a step of applying the first base coating composition to an article to be coated to form an uncured first base coating film;

a step of applying the second base coating composition to the uncured first base coating film to form an uncured second base coating film;

a step of applying a clear coating composition for forming a clear coating film to the uncured second base coating film to form an uncured clear coating film; and a step of simultaneously baking and curing the uncured first base coating film, the uncured second base coating film, and the uncured clear coating film to form a multilayer coating film, wherein a heat-cured first base coating film formed from the first base coating composition has a film thickness t1 of 1 $\mu$m or more and 35 $\mu$m or less, a heat-cured second base coating film formed from the second base coating composition has a film thickness t2 of 1 $\mu$m or more and 20 $\mu$m or less, a nonvolatile content NV1 in the first base coating composition is 10% or more and 45% or less, a nonvolatile content NV2 in the second base coating composition is 3% or more and 17% or less, and the nonvolatile content NV1 is greater than the nonvolatile content NV2.

16. The method for forming a multilayer coating film according to claim 15, wherein the film thickness t1 of the heat-cured first base coating film and the film thickness t2 of the heat-cured second base coating film have a relationship of (t1)$\geq$(t2).

\* \* \* \* \*